United States Patent [19]
Alkon et al.

[11] Patent Number: 5,822,742
[45] Date of Patent: Oct. 13, 1998

[54] DYNAMICALLY STABLE ASSOCIATIVE LEARNING NEURAL NETWORK SYSTEM

[75] Inventors: Daniel L. Alkon; Thomas P. Vogl, both of Bethesda; Kim T. Blackwell, Wheaton; Garth S. Barbour, Laurel, all of Md.

[73] Assignees: The United States of America as represented by the Secretary of Health & Human Services, Washington, D.C.; ERIM International, Inc., Ann Arbor, Mich.

[21] Appl. No.: 331,554
[22] PCT Filed: May 13, 1993
[86] PCT No.: PCT/US93/04364
§ 371 Date: Feb. 24, 1995
§ 102(e) Date: Feb. 24, 1995
[87] PCT Pub. No.: WO93/23822
PCT Pub. Date: Nov. 25, 1993

Related U.S. Application Data

[63] Continuation-in-part of Ser. No. 882,646, May 13, 1992, abandoned, which is a continuation-in-part of Ser. No. 524,319, May 17, 1990, abandoned, which is a continuation-in-part of Ser. No. 448,090, Dec. 12, 1989, Pat. No. 5,119,469, which is a continuation-in-part of Ser. No. 353,107, May 17, 1989, abandoned.

[51] Int. Cl.$^6$ ........................................................ G06F 15/18
[52] U.S. Cl. .............................. 706/31; 706/20; 706/25; 382/159; 382/181; 382/185
[58] Field of Search .................. 395/21, 24, 22, 395/23; 382/159, 181, 185; 706/31, 20, 25

[56] References Cited

U.S. PATENT DOCUMENTS

| | | | |
|---|---|---|---|
| 5,040,230 | 8/1991 | Takatori et al. | 706/20 |
| 5,222,195 | 6/1993 | Alkon et al. | 706/25 |
| 5,335,291 | 8/1994 | Kramer et al. | 706/20 |
| 5,359,700 | 10/1994 | Seligson | 706/25 |
| 5,588,091 | 12/1996 | Alkon et al. | 706/31 |

FOREIGN PATENT DOCUMENTS

| | | | |
|---|---|---|---|
| WO 90/14631 | 11/1990 | WIPO | G06F 15/18 |
| WO 91/10196 | 7/1991 | WIPO | G06F 15/00 |

OTHER PUBLICATIONS

R.P. Lippmann, "An Introduction to Computing with Neural Nets," IEEE ASSP Magazine, pp. 4–22, Apr. 1987.

J. Moody and C. Darken, "Learning with Localized Receptive Fields," Proc. 1988 Connectionist Models Summer School, pp. 133–143, Dec. 1988.

R.P. Lippmann, "Pattern Classification Using Neural Networks," IEEE Communications Magazine, vol. 27 (11), pp. 47–64, Nov. 1989.

S. Wolpert, et al., "A VLSI–Based Gaussian Kernel Mapper for Real–Time RBF Neural Networks," 1992 18th Annual Northwest Conf. on Bioengineering, pp. 51–52, Mar. 1992.

G. Dorffner, "Cascaded Associative Networks for Complex Learning Tasks," Neural Networks from Models to Applications, pp. 244–253, Dec. 1988.

H. R. Berenji and P.S. Khedkar, "Clustering in Product Space for Fuzzy Inference," Int'l. Conf. on Fuzzy Systems, vol. 2, pp. 1402–1407, Mar. 1993.

Vogl, IJCNN–91, International Joint Conference on Neural Networks, 1:97–102, Jul. 8, 1991.

Primary Examiner—Robert W. Downs
Attorney, Agent, or Firm—Spencer & Frank

[57] ABSTRACT

A dynamically stable associative learning neural system includes a plurality of neural network architectural units. A neural network architectural unit has as input both condition stimuli and unconditioned stimulus, an output neuron for accepting the input, and patch elements interposed between each input and the output neuron. The patches in the architectural unit can be modified and added. A neural network can be formed from a single unit, a layer of units, or multiple layers of units.

51 Claims, 15 Drawing Sheets

DYNAMICALLY STABLE ASSOCIATIVE LEARNING NEURAL NETWORK SYSTEM

This application is a continuation-in-part of commonly assigned U.S. patent application No. 07/882,646 filed May 13, 1992, now abandoned, which is a continuation in-part of application Ser. No. 07/524,319, filed May 17, 1990, now abandoned, which is in turn a continuation-in-part of commonly assigned U.S. patent application No. 07/448,090 filed Dec. 12, 1989 and issued Jun. 2, 1992 as U.S. Pat. No. 5,119,469 which is in turn a continuation-in-part of commonly assigned U.S. patent application No. 07/353,107 filed May 17, 1989 and entitled "Dynamically Stable Associative Learning Neuron Circuit and Neural Network," and abandoned.

Certain rights in the present invention may arise pursuant to ONR contract N00014-88-K-0659 and NIH contract N01NS02389.

BACKGROUND OF THE INVENTION

The present invention relates to a dynamically stable associative learning neural network system involving neuron circuits and networks and, more particularly, to a neuron circuit employing a novel learning rule which enables associative learning, including correlations and anti-correlations, with decreased computational time and complexity.

Efforts have been made to use neural networks to emulate human-like performance in the areas of pattern recognition including pattern-recognition applications in speech or image recognition, classification systems, and adaptive control systems. The basic computational element of a neural network is the neuron circuit which typically has multiple input lines and a single output line. The output response of a neuron circuit is generally a nonlinear function of the sum of the signal amplitudes on its input lines, with an output response being triggered when the sum of the input signal amplitudes exceeds a threshold value. The output of a neuron circuit may be coupled to the input of more than one other neuron circuit.

A neural network is formed by interconnecting the neuron circuits through synapses, each of which has an associated weight for modifying any signal passing through it. The amplitude of a signal exiting a synapse is thus the product of the weight associated with that synapse and the amplitude of the signal entering the synapse. A synapse may be either excitatory, that is, its weight is positive because it contributes to production of a signal by the associated neuron circuit, or inhibitory, that is, its weight is negative.

The output end of each synapse terminates at an input line to a neuron circuit, with the other end connected to either the output line of another neuron circuit or to a primary input (i.e., the receptor) to the neural network. The primary outputs of a neural network are each derived from a single output line of one of the neuron circuits in the system. With such loose restrictions, a large number of differently configured neural networks can be formed by simply varying the synaptic connections between neuron circuits.

The two major classes of artificial neural networks developed are (1) single layer networks in which a set of neuronal elements are fully interconnected with each other and which function as associators, and (2) multilayer perceptrons in which all interconnections are feed-forward connections between layers and which function as pattern classifiers. For the networks in these two classes, the basic neuronal models used are variants of a concept in which (1) "synaptic" inputs to an element are summed and the element fires if a threshold is exceeded, and (2) the weight or strength of a synaptic junction is increased only if both the presynaptic and post-synaptic elements fire. Essentially, all of the currently popular neural network designs implicitly or explicitly use the element to be formed in the adjustment of the weights on its input. In most implementations, a nonlinear optimization or relaxation algorithm is used for setting weights. These algorithms are all computationally intensive, since for each set of inputs to be learned many iterations are required before convergence is achieved and the network has learned the input patterns. Depending on the details of the implementation, the computational complexity of these algorithms (reflected in the number of iterations needed to achieve convergence) is between $O(N^2)$ and $O(N^3)$ where N is the number of weights (connections) to be determined. Consequently, the total computational effort per connection increases as the number of connections is increased. A survey of neural networks can be found in R. P. Lippmann, "An Introduction to Neural Nets," IEEE ASSP Magazine, Pgs. 4–21, Apr., 1987 and in Neural Networks for Control, 1992.

Neural networks are taught by successive presentation of sets of signals to their primary inputs with each signal set derived from a pattern belonging to a class of patterns, all having some common features or characteristics. Each time a set of signals is presented to the primary inputs, the synaptic weights must be adapted in order for the neural network to learn from this input.

The primary disadvantages associated with prior art neural networks result from their methods of adapting synaptic weights when the neural networks are in the training mode. Essentially, conventional neural network designs implicitly or explicitly use the output response of a given neuron circuit in adjusting the weights of the synapses connected to its input lines (see, for example, U.S. Pat. No. 3,950,733 issued Apr. 13, 1976 to Cooper et al). The use of the output response requires nonlinear optimization or relaxation algorithms which are computationally intensive; for a relatively small network of neuron circuits, thousands or ten of thousands of iterations are typically required before convergence is achieved and the network is said to have learned a set of input patterns. As the number of neuron circuits increase, the computational time to achieve convergence increases at an polynomial rate.

Additionally, most neural networks require a noise free external teacher that provides the neural network with a desired set of output values chosen to represent the class of patterns being learned. Sets of signals representing the exemplary input patterns are successively applied to the primary inputs and propagate through the neural network to the output. The differences between the actual and desired output vales, determined by the external teacher, are calculated to arrive at an error signal that is employed, typically with a nonlinear algorithm, throughout the network to adjust synaptic weights. This process is repeated in a recurring manner and typically requires a large number of iterations to reduce errors appearing at the primary outputs to an acceptable level.

To overcome some of the limitations of the art, a neural network has been developed which has many advantageous properties including the ability to learn, store and recall associations among vast numbers of noisy patterns. This network is qualitatively different from sum-of-weighted input models proposed by others. Also, other image understanding/object recognition systems are not based on associative learning.

SUMMARY OF INVENTION

This invention relates to a neural network system characterized by evolutionary levels of increasing complexity that represent improvements and enhancements in the ability of the system to function, for example, in the context of pattern recognition and classification. A basic architectural unit is a group of neurons that forms a layer. A hierarchy builds from a basic architectural unit, comprised of input and output elements with so-called "patches" (see definition below) interposed, by improving and expanding that basic unit to a multilayered system based on a concatenation of the basic unit, and to subnetworks linked in series or parallel to form a multi-subnetworked system.

A subnetwork is a neural network that is a functional unit of an aggregate of subnetworks that form a neural network system.

Thus, in accordance with the present invention, the input presented to a basic neural network architectural unit comprises a first input signal comprising a set of conditioned stimuli (CS), and a second input (UCS) signal comprising an unconditioned stimulus. In some embodiments of the invention, CS arise from a pattern to be classified and UCS represents a classification category.

A signal is a detectable physical quantity or impulse (such as a voltage, current, or magnetic field strength) by which information can be transmitted; it may be a physical representation of data. Input signals may be generated by an optical scanner, for example, by scanning a visual image, such as a photograph or a handwritten set of numbers, a "chipped" digital image wherein images are digitally extracted from photos into image chips, or an analog output from an instrument, such as an oscilloscope showing a voice waveform. Input signals may be continuous or discrete (binary).

These input signals generate or modify the "patches," which are storage and processing areas interposed between the input and output elements of the system. The use of patches in the present invention is an improvement over systems that employ indirect connections, called "interneurons," between input and output, and over competitive learning networks.

More specifically, patches are created initially by signals input to the system. Patches are storage areas in whatever physical apparatus is used to implement a neural network of the present invention, and are important elements where signals interact and are modified according to the training set developed for a particular application and the network training rules. In particular, patches are the sites of local learning in the immediate vicinity of paired stimuli (conditioned and unconditioned) where component signals are aggregated and simplified so that network association learning is made efficient.

Patches are dynamic areas which respond to conditioned and unconditioned stimuli in accordance with various rules and methods, as presently disclosed, so as to organize signals into classes and/or features and to process the signals, thereby to condense or modify information to achieve goals of particular applications of the network.

A training or learning rule is a set of relationships that determine how the CS and UCS interact to modify the patches. A difference between training and testing the system, is that patches are not modified in the latter phase. In Example 1 herein, for example, weights of the most similar patch to a new input signal, and of all other patches are determined according to prescribed Equations 3 and 4.

An overall goal of the present invention is training a network so that it performs a given task. A trainable network may be trained by input of a training set. The task is defined by the training set presented to the network.

Recent neurobiological research strongly suggests that long-term storage of learned associations occurs in post-synaptic dendritic patches. An increase in responsivity of a dendritic patch results from repeated stimulation of the patch by a series of similar signals presented in the same temporal relationship to each other. Increased responsivity is essentially a local phenomenon, independent of whether the output neuron responds to input or not. A local learning rule that is independent of neuron output is useful, since it requires neither error correction nor feedback.

Associative learning in the present invention is facilitated by storing the associations in the "dendritic patches." In this scenario, the firing of the neuron is a readout of the UCS associated with the active patches. The result is a network with combinatorial specificity, where the pattern of neuron firings is the information-bearing code.

Significant advantages of the network are realized with the implementation of dendritic patches which model the local interaction of unconditioned stimuli and conditioned stimuli pathways into two separate input streams. The pathway for the unconditioned stimuli pattern is separate and distinct from the pathway for the conditioned stimuli pattern. Also, in order to induce associative learning, the unconditioned stimuli pattern is presented together with the conditioned stimuli pattern (each to their own input neurons). After the association has been learned, presentation of the conditioned stimuli input alone will elicit, as the output of the network, that unconditioned stimuli with which that conditioned stimuli has previously been associated.

The basic architectural unit of the network also includes an output neuronal element with a receptive field. This field comprises i) a subset of the conditioned stimuli and ii) a component of the unconditioned stimuli associated with the CS subset. Output may occur in the form of reconstructed, processed or classified images, depending on the problem presented to the network. For example, a goal may be to recognize an individual face despite different views of the face being presented as input. The present invention also relates to various modifications, extensions and expansions of the basic architectural unit, said unit defined as signals input to the system, patches, and output signals.

In embodiments that modify and extend the network, there may be a plurality of patch elements, each of which connects a plurality of input stimuli with an output neuronal element. Patches are each capable of learning an association.

Patch elements occupy positions in a hyperspace volume in the system which may be created, deleted or modified by various procedures disclosed herein. The purpose of these patch-creation, -deletion and -modification procedures is to improve the performance of the system by increasing efficiency and/or accuracy.

As disclosed herein, in the fixed threshold model of patch creation (constant size), the closest patch for the stored UCS which is the same as that of the CS is found by the use of the similarity between a conditioned stimulus and preexisting patches. If the computed similarity falls below some threshold, a new patch is created whose patch vector equals the input pattern. If the similarity is larger than the threshold, the patch is updated. This threshold ensures that all patches will cover a similar "size" or area in n-space (hyperspace).

An aspect of the present invention is to use patches more effectively by allowing patches to vary in area within predefined thresholds. Variable size patches facilitate efficiency because new patch creation is limited to where patches are needed, for example, to refine boundaries, which addresses the limitation that the more patches created, the larger is the network and the slower its operation on a serial computer.

A term used interchangeably with "variable size" patches is "variable radius" patches, where a radius may be considered as a threshold in n-space. In this method, the closest patch is selected regardless of its UCS. The UCS is then considered, and if it does not match, a new patch is created, regardless of the similarity between the CS and the patch.

The "variable radius" method provides a means for controlling resolution of the definition of boundaries between adjacent classes in a neural network. There may be different architectural units, each with different rules for creating and altering patches—some fixed, some variable. A "network" is used to refer to an operatively linked set of components, wherein a component includes a subnetwork, and a subnetwork may include one or more layers. In the multilayered (multi-subnetworked) network disclosed in subsequent sections, different layers (subnetworks) may have different rules. This allows for great flexibility in the system.

There are generally two thresholds for the variable-radius-patch-creation method. These thresholds may be designated $T_H$ and $T_L$. To illustrate the use of these thresholds, if $T_H$ defines a boundary in hyperspace, and $T_L$ defines a boundary beyond $T_H$, if an input CS value falls within the boundary defined by $T_H$ for the patch with the most similar patch vector, that the patch will be updated. If the value lies beyond $T_L$, a new patch will be created even if it has the same UCS.

Variable size patch creation thus is a method of creating patches that more efficiently cover the hyperspace formed by the set of the input patterns. It allows the system to create many "small" patches where needed to distinguish similar CS patterns that have different UCS values associated with them, but use a few "large" patches where all similar patterns have the same UCS value. This results in fewer patches needed for most problems and is directed toward better results where patterns of different kinds have subtle differences.

Another aspect of the present invention is to provide enhancements that permit a patch to modify its own receptive field. A receptive field includes those components of the conditioned stimuli input that are connected to an output neuron.

One modifying method to effectively reduce the size of the receptive field is by "pruning." The effect of "pruning" is to allow patches to have a customized receptive field. In general, if a connection to a patch varies significantly while the patch is active, relative to the variability of the input value overall, that connection is removed from the patch's receptive field. Subsequent comparisons for matching of patches ignore the incoming signal on that connection. Advantages of "pruning" include savings in computational time and improved classification accuracy, assuming the pruned connections represented noise rather than information.

Another aspect of the present invention is "budding," a method of optimizing the number of connections to a patch. Basically, conditioned and unconditioned stimuli enter the receptive fields of the output neurons. If the receptive fields are considered without "budding," the entire receptive field is active. With budding, a subset of the field is designated as "active" and is used to calculate the similarity measure; the inactive portion is passive for calculating the similarity measure, but is updated for calculation of the running average. For example, 10% of the entire signal input may be selected as the active receptive field. The selection criteria for the "active" field will depend on the nature of the problem, for example, the active section may be chosen at random or selected based on some aspect of the problem or classification, perhaps a geographic area, a Gaussian data conversion, or the like.

Some input values will have low variance overall and therefore will contain no information. Similarly, if the within-class variance approximates the among-class variance, those connections will be of little use as classifiers. Conversely, small intraclass and larger interclass variances characterize good discriminators. Methods designated as "pruning" and "budding" may remedy these limitations and, depending on the circumstances, may be used simultaneously. Budding is useful when there is a sparse receptive field and addition connections are helpful. Pruning is a method for removing connections that appear to contribute little, if anything, to classification and pattern recognition from a large receptive field. For use of these methods, it is necessary to keep track of the variances of the patches.

In its initial form, as disclosed herein, the neural network consists of one layer of neurons. Each neuron creates patches that store associations between an input (CS) pattern derived from the neuron's receptive field (RF) and an input (UCS) value, which is often an element of a classification vector. As such, there is one neuron for each component of the UCS vector.

When a pattern is presented, each neuron compares its input pattern (the pattern within its RF) with the patch vector (as stored pattern of CS values) of each of its patches. It then selects the patch with the most similar patch vector (using, for example, Pearson's r, a measure of correlation, as a similarity measure). During training, if the patch vector of the selected patch is not sufficiently similar to the input pattern, or if the UCS value stored in that patch differs from the input UCS value, a new patch is created. Otherwise, the patch is considered matched and is updated.

When a new patch is created, it has a patch vector equal to the input CS pattern for the neuron, and a UCS value equal to the input UCS value for the neuron. When an extant patch is matched, both the patch vector and UCS value are updated to become an approximation of the average of all of the input patterns which have matched the patch. During both training and testing, the neuron outputs (propagates) the UCS value of the active (matched or created) patch, which, when appropriate for a specific application, may be multiplied by the similarity value calculated for the active patch. Therefore, upon presentation of a CS input pattern, a network produces the associated UCS pattern for output.

Another aspect of the present invention relates to a multilayered (multi-subnetworked) network, that is, a concatenation of single subnetworks (wherein a subnetwork is equivalent to a basic architectural unit) to improve feature recognition capabilities of a neural network system and to permit the combination of outputs of subnetworks operating in parallel or series.

Both single and multiple layer Dystal networks learn to associate pairs of input patterns. Although a single layer Dystal network learns to associate pairs of input patterns by performing this association in one layer, a multiple layer Dystal network uses multiple layers in a hierarchical fashion, generating features of the input pattern prior to classification.

Groups of related inputs are learned as features by the first layer. The next layer then learns to group these features into "super-features", and other layers continue to make refinements, until the final layer associates a group of super-features from the layer immediately below with an output value that serves to classify or reconstruct the input pattern.

Humans and other animals, who have superior classification abilities, use features in an analogous manner when performing classification. These feature extraction and grouping properties of multilayer Dystal greatly improve performance.

In a two-layer embodiment of a neural network, the first layer is structured either by eliminating the UCS inputs or by setting all UCS inputs to the same value, irrespective of the class of training exemplars. Initial Cs input is received by the system as defined for a single subnetwork. Patches that are formed in this embodiment reflect only similarity of CS patterns, independent of their classification.

If the receptive fields represent only a portion of the complete input pattern, then the patches will record and respond to similarities in the portion of the input field to which they are attached, that is, to the similarity of "features" within that portion of the field. Consequently, the output neurons of this first layer transmit, as the input to the second subnetwork not the product of the most similar UCS with the similarity measure, as in the basic network, but rather the identification label of each patch and, optionally, the similarity value as a pair of numbers for the most similar patches.

In one embodiment of a two-subnetwork neural network, the first subnetwork propagates a relatively small number of patch numbers and (optionally) their associated similarity to the second subnetwork. That number can be chosen either by stipulating a threshold similarity that must be exceeded by the patch to be considered, or a numerical limit (e.g., the five patches with the greatest similarity, or a combination, those patches with a similarity in excess of a threshold, but no more than the top five of these). Appropriate similarity measures are chosen from those disclosed herein. Use of correlation coefficients, normalized dot products, power-divergence statistics and the like divide the input hyperspace into cones. The classifying UCS is presented to the UCS input of the second subnetwork.

The basic structure of input elements, patches and output elements in a two-subnetwork can be extended further to a multilayered (multi-subnetworked) neural network, which comprises n subnetworks, wherein the first subnetwork is defined as having an input conditioned stimuli and output neurons that are connected to the input neurons through patches. The output of the first subnetwork provides the input to the second subnetwork, said second subnetwork input being transmitted to the second output neurons through patches in the second subnetwork, wherein each of said patches may receive input from a plurality of output neurons of subnetwork 1. Further, each successive subnetwork is linked to subnetwork n−1 by the output of the n−1 subnetwork, the output of n−1 serving as the input of n, and wherein unconditioned stimuli are input to the nth (final) subnetwork. The bigger the n the greater the abstraction or compression of information that is achievable. A subnetwork may have one or more layers.

In this network, the input to each successive layer (or subnetwork) comes from a multiplicity of outputs from a previous subnetwork. CS inputs in the first subnetwork are as described for the basic architectural unit, but input to subsequent layers are output elements representing patch identifiers from the previous subnetwork. The final subnetwork receives UCS as in the simpler embodiments, one component to each patch of the final subnetwork. Accordingly, there must be at least as many output neuronal elements in the final layer as there are components to the UCS. An advantage to the multi-subnetworked system is the abstraction of information from signals as subsequent layers (subnetworks) are encountered.

Layers (or subnetworks) may have different patch creation rules, that is, they may use pruning and/or budding or neither. The basic criterion for a multilayered (multi-subnetworked) network is that the output of subnetwork n−1 is the input of the nth subnetwork.

In view of the foregoing, it is an object of the present invention, among others, to provide a dynamically stable, associative learning neural network system which is capable of signal classification, pattern recognition, and other feats. The system associatively learns both correlations and anti-correlations.

It is another object of the present invention to provide a dynamically stable, associative learning neural network system that can be configured to classify or to restore patterns simply by changing the number of output units.

It is a further object of the present invention to provide a dynamically stable, associative learning neural network system in which neither global nor local feedback connections are required during learning, thus eliminating the need for any non-linear optimization or iteration.

In view of these and other objects, the present invention provides a dynamically stable, associative learning neural network system which in its general form provides for the separation of UCS and CS pathways into two separate input streams, and which entails the implementation of dendritic "patches" which model the local interaction of USC and CS pathways during associative learning.

For neurons with binary outputs, 50 neurons are capable of encoding $25^{50}$ noise free messages. If b different firing intensities can be differentiated, $b^N$ different messages are possible where N is the number of output neurons sharing common inputs, and b is the number of distinguishable gray levels.

An advantage of the network exploited in accordance with the present invention is that it has a computational effort that scales linearly in complexity with the number of connections, i.e., O(N). For example, on a completely parallel computer, learning time is constant regardless of the size of the network. The number of pattern-set presentations is small compared to other systems and does not change with pattern-size or complexity.

A network of the present invention exhibits monotonic convergence, reaching equilibrium values after being fully trained, without oscillating. Neural networks are machine independent, that is, a neural network can be implemented in hardware, software, or a combination of both. Many different types of hardware or software may be employed for the operation of the system. Those of skill in the art will select the appropriate hardware, software, or combination thereof, appropriate to a particular application. For example, some aspects of the system are readily implemented on a VLSI chip.

The present invention eliminates the need for, but does not preclude, a noise-free, external teacher. In addition, there is no need for feedback of some output parameter or error measure in order for the network to learn an association.

Still another advantage of the present invention is the minimal constraints on architecture when it is embodied in neural networks. Because changes in synaptic weights are based solely on the signal history of synapses within the same receptive field of a neuron circuit, either feedback or lateral connections can be made between layers of neuron circuits or within the same layer of neuron circuits without changing the method of teaching the neural network. Thus, the learning rule does not restrict the global connections of the network.

The explicit inclusion of time within the learning rule enables neural networks constructed with neuron circuits according to the present invention to associate arbitrary patterns. In the prior art, some external error measure was needed to guide the learning process.

It has been found that neural networks constructed of neuron circuits employing the learning rule of the present invention learn more quickly than those of the prior art. The typical neural network of the prior art requires many times more iterations than the present invention to learn an association.

Other objects and further scope of applicability of the present invention will become apparent from the detailed description to follow, taken in conjunction with the accompanying drawings, in which like parts are designated by like reference characters.

BRIEF DESCRIPTION OF THE DRAWINGS

The present invention is further described by way of examples and drawings wherein.

DETAILED DESCRIPTION OF PREFERRED EMBODIMENTS

Figure 1:
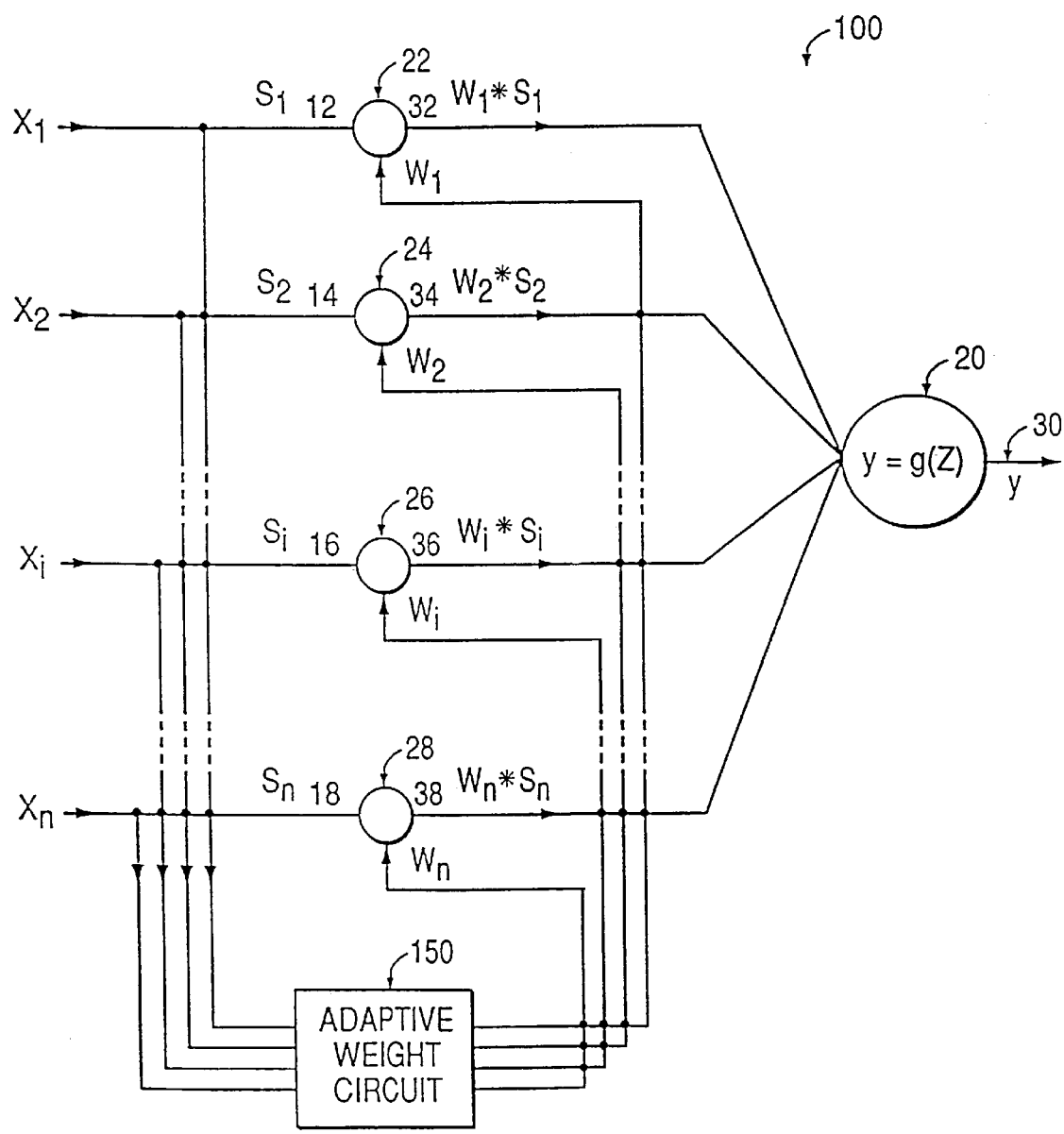
FIG. 1 is a schematic diagram illustrating a single neuron circuit including variable synapses in accordance with an embodiment of the present invention.

A neural network is constructed of a plurality of interconnected neuron circuits with various types of such interconnections known in the art. The neural network operates by receiving one or more input signals and transforming these input signals into one or more output signals through the interconnected neuron circuits. In the related art, the weights of the various synapses control the response of each neuron circuit and hence the overall response of the neural network. Typically, the various weights are adjusted during a learning process to provide the desired network response. In the prior art, this learning process involves the application of various exemplary inputs for comparison of the actual outputs with the desired outputs. This feedback process may not converge quickly and equilibrate at the weights required for the desired network response. In addition, this technique requires the use of global parameters, namely the network outputs, for the adjustment of each individual synapse. The present invention represents substantial difference and improvements over other networks.

In an illustrative embodiment, the present invention provides a plurality of synapses, each synapse having a synaptic weight for producing a signal proportional to the product of the input signal and the weight, and a non-linear function circuit, such as a step, threshold, or sigmoid function circuit, for summing the outputs of each synapse and producing a nonlinear summation output. An adaptive weight circuit is provided for adjusting the weight of each synapse based upon the current signal, and at least one prior signal applied to the input of the particular synapse and the current signal and at least one prior signal applied to the input of a predetermined set of other synapses.

The weight of a synapse is increased if and only if that particular synapse and a predetermined set of other synapses all receive nonzero signals on their respective synaptic inputs for both the current time and the immediately preceding time. The weight of a synapse is unchanged and thus retained if and only if the particular synapse receives nonzero signals on its inputs for both the current time and the immediately preceding time and the predetermined set of other synapses do not all receive nonzero signals on their respective synaptic inputs for both the current time and the immediately preceding time. In all other cases the adaptive weight circuit reduces the weight of the particular synapse.

In an illustrative embodiment, the synapses have a maximum weight value and a minimum weight value. When the weight is increased, the amount of the increase is proportional to the difference between the prior weight and the maximum weight value, and, when the weight is decreased, the amount of the decrease is proportional to the difference between a prior weight and the minimum weight value.

Another illustrative embodiment of the present invention includes a f low-through synapse, that is, a synapse having a predetermined fixed weight near the maximum weight value, which flow-through synapse is not coupled to the adaptive weight circuit.

A network is formed employing neuron circuits of the adaptive and flow-through types and includes a plurality of input terminals and an equal number of output terminals. At least one layer of neuron circuits are connected between the input terminals and the output terminals. Flow-through neuron circuits are connected by flow-through synapses to form separate and direct paths between each input terminal and a corresponding output terminal. The collateral neuron circuits are connected to synapses with adjustable weights connected to the outputs of other neuron circuits to permit correlative learning.

The neural network is initialized by setting the adjustable weight synapses at some value near the minimum weight with each fixed weight of each flow-through synapse set near the maximum value, for example, 0.91. This value is set so that the inputs will not propagate to the outputs without additional stimulation from collateral neuron circuits, that is, neuron circuits not on the flow-through path. The neural network is taught by successive application of sets of input signals to the input terminals until a dynamic equilibrium is reached in which the sum of the weight increases and the weight decreases over a set of input presentations is zero or near zero.

In still further and preferred embodiments, each output element has a dynamically allocated number of memory storage devices known as "patches." Each patch stores a single association between (1) the portion of the conditioned stimuli (CS) input in the output element's receptive field; and (2) that element of the associated unconditioned stimuli (UCS) input related to that output. The memory of an entire Cs pattern is distributed over many patches and output neurons, each of which learns a portion of the pattern.

A patch is composed of: (1) a patch vector, which is the average value of the CS input patterns that it has matched (each component of the patch vector is real-valued and receives input from a single CS input element); (2) the expected value for the UCS component associated with this CS and output neuron; and (3) a weight that reflects the frequency of use of the patch. Every patch of a given output neuronal element is connected to the same subset of CS inputs. Thus, each patch learns an association between a CS input sub-pattern and a component of the UCS input by storing both the vector of CS input values and the value of the UCS input component. One of the ways patches differ from prior art network components is that the latter calculate output by (weight x signal) algorithms in which each individual input is multiplied by a weight associated only with that input connection.

In an extension of the network suitable for gray-scale pattern recognition, patch information is stored as multi-bit values and the similarity between patch vectors and input pattern is computed using a geometrically specific function of the stored patch vector. The input signal pattern is transmitted by the direct connection. A suitable function includes Pearson's R which provides a range between −1 and +1 (inclusive) that provides a measure of correlation, with +1 indicating complete correlation, a −1 indicating negative anti-correlation, and a zero representing no correlation. Because the similarity-computation uses the input signal transmitted by the CS connections, interneurons and indirect connections are not needed. The signal propagated is a function of the computed similarity between the patch vector and the input pattern, and all patches above a computed-similarity threshold participate in signal propagation. In the extended network, the learning rule for calculating the weight on the patch includes storing a moving average of CS signals, and storing a moving average of the unconditioned stimuli signal to allow gray scale values to be learned, distinguished and reproduced. Additionally, the frequency of use of each patch is determined and, where the frequency of use is below a certain value, that patch is removed.

FIG. 1 illustrates a neuron circuit 100 in accordance with one embodiment of the present invention. The neuron circuit 100 includes input lines $X_1, X_2, \ldots, X_i, X_n$; synapses 22, 24, 26, and 28; function circuit 20; and output line 30 and an adaptive weight circuit 150. The adaptive weight circuit 150 receives signals from each of the input lines $X_i, X_2, \ldots, X_i, \ldots, X_n$ and includes outputs connected to the synapses 22, 24, 26, and 28 for adjustment of the respective weights $W_1, W_2, \ldots, W_i, \ldots, W_n$. The adjustment of each weight depends upon current or present input to that synapse, the prior history of inputs to that synapse, and the current and prior inputs to at least one other synapse of the same neuron circuit.

Figure 2:
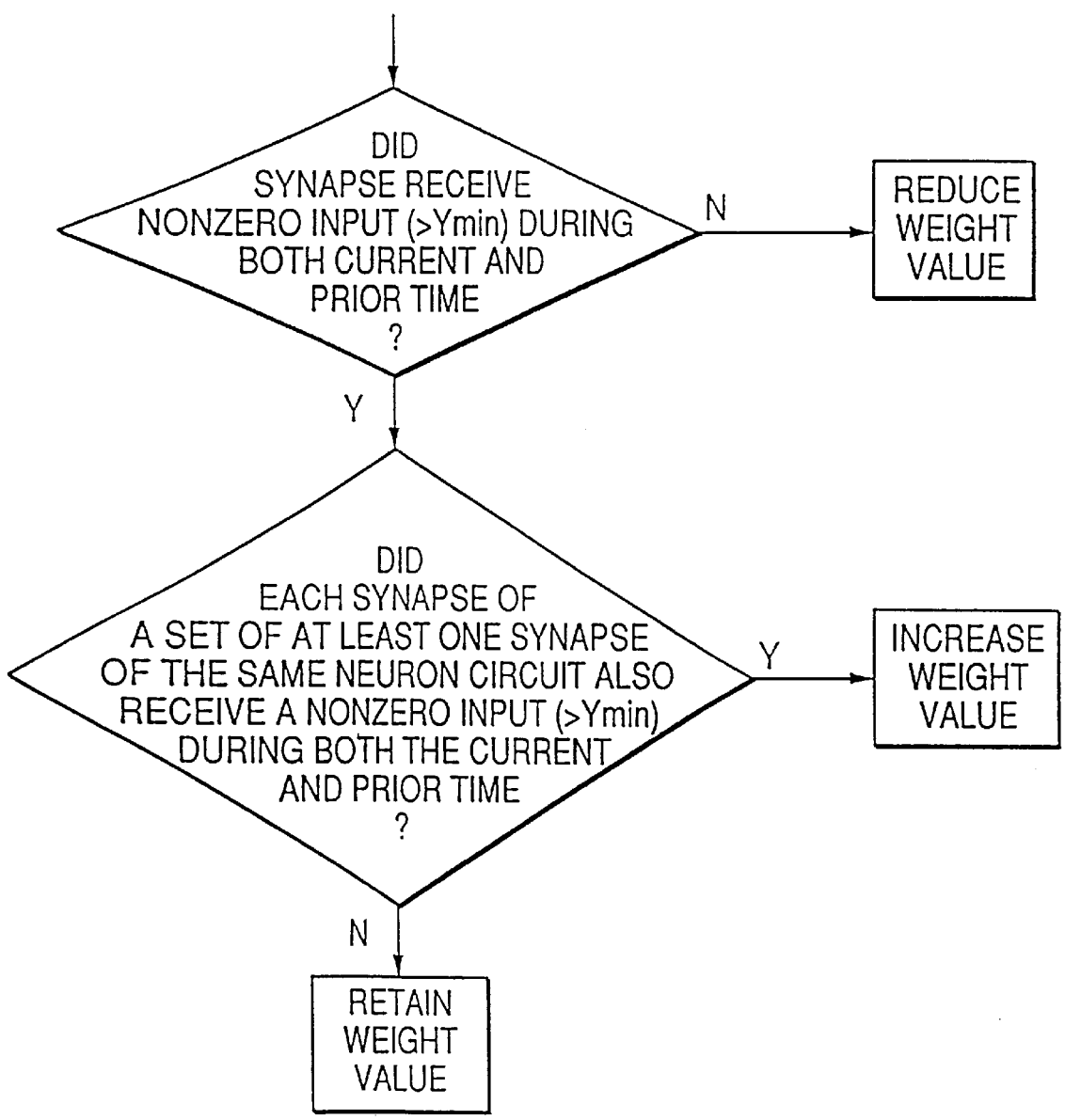
FIG. 2 is a flow diagram illustrating, in schematic form, the synaptic-weight training rule for the adaptive weight circuit of FIG. 1.

The preferred synaptic-weight training rule for the adaptive weight circuit 150 for modifying the synaptic weights is shown in flow chart form in FIG. 2. The adaptive weight circuit 150 considers each synaptic weight once each time period, i.e., a predetermined sensing or operating time period. The weight of a particular synapse may be either increased, retained at the same level, or decreased. The weight of a particular synapse is increased if, and only if, that synapse received a nonzero input during both the current time period and the immediately prior or preceding time period and each synapse of a predetermined set of at least one synapse of the same neuron circuit also received a nonzero input during both the current and immediately prior time periods. The weight of a particular synapse is retained at the same level if, and only if, that synapse received a nonzero input during the current and immediately prior time periods and not all synapses of the predetermined set of synapses received a nonzero input during both the current and immediately prior time periods. Otherwise the weight of that synapse is reduced. By nonzero input, the above synaptic-training rule refers to a signal greater than the minimum output signal $Y_{min}$ with $Y_{min}$ =zero in the preferred embodiment.

When a weight W is modified, the rate of change is proportional to the difference between the current value W and the extreme allowed value in the direction of change. These extremes may be, for example, 0 or 1 for an excitatory synapse and −0.5 or 0 for an inhibitory synapse. The constants of proportionality for increasing and decreasing the values of collateral synapse weights are a and b, respectively. Thus, if a weight W is to be increased, the new value W' is given by:

$$W'=W+a*|W_{max}-W|$$

If the weight W is to be decreased, then the new value W' is given by:

$$W'=W-b*|W-W_{min}|$$

where, for example: a=0.33; b=0.005: $W_{max}$=1.0; and $W_{min}$=0.0 for excitatory synapses; and $W_{max}$=0.5 and $W_{min}$=0.0 for inhibitory synapses.

FIG. 2 is a diagram of a training rule for the circuit of FIG. 1.

Figure 3:
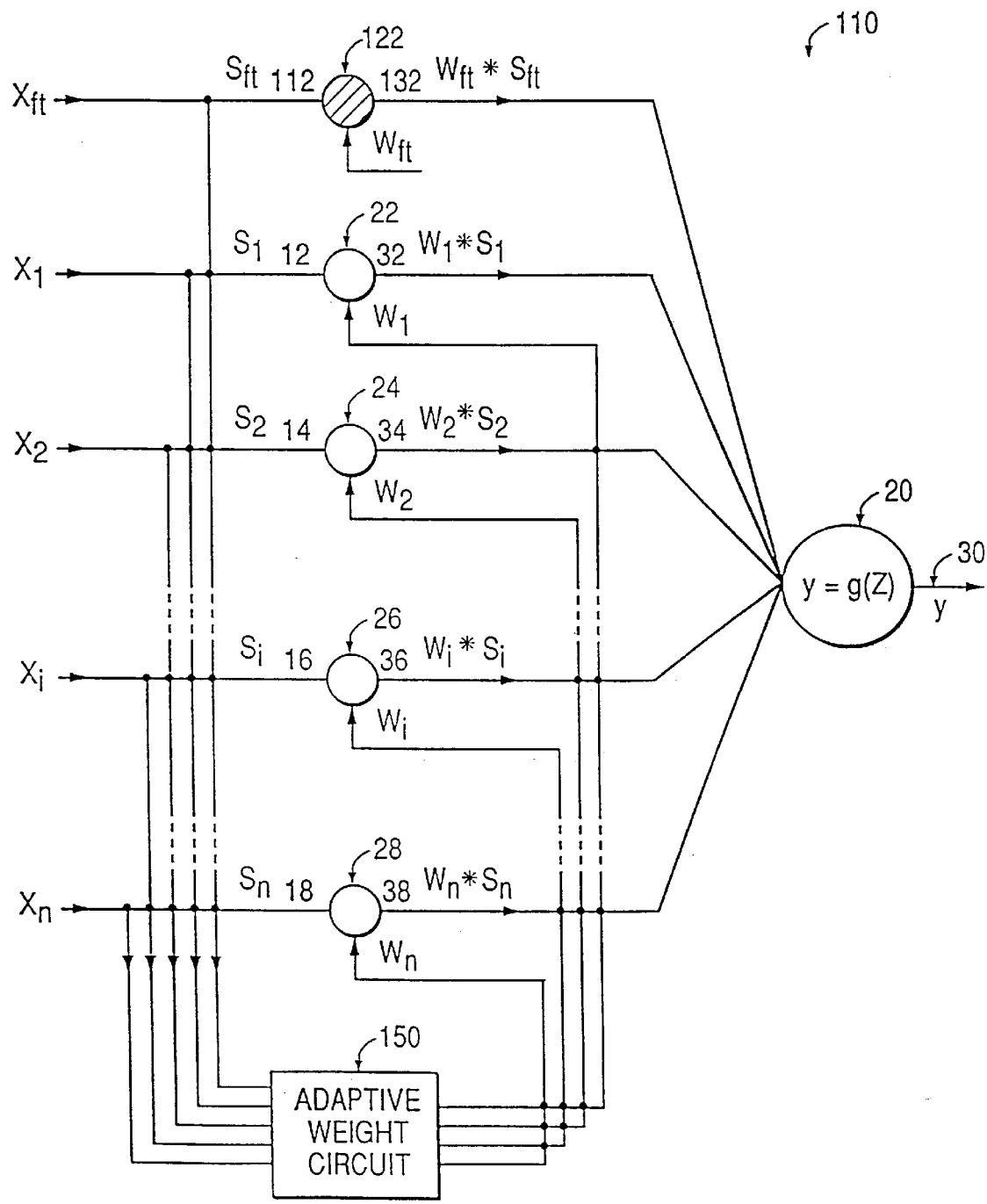
FIG. 3 is a schematic diagram illustrating a single neuron circuit including two types of connections, flow-through and collateral, in accordance with an embodiment of the present invention.

FIG. 3 illustrates a neuron circuit 110 in accordance with an illustrative embodiment of the present invention utilizing two types of connections: flowthrough connections, which serve to define a set of principal pathways, and collateral connections. These two types of connections differ in that the weights (synaptic strengths) of flow-through connections are always set at a constant high value and the collateral connections are initially set at a low value and are modified according to the above-mentioned synaptic training or learning rule.

The neuron circuit 110 of FIG. 3 is similar to neuron circuit 100 of FIG. 1 with the addition of a flowthrough synapse 122 (having a cross-hatched pattern). The flow-through synapse 122 has an input 112 connected to receive the input on line $X_{ft}$, an output 132, and a predetermined fixed weight $W_{ft}$. The adaptive weight circuit 150 is connected to input line $X_{ft}$ to receive the input signal to the flow-through synapse 122 so that the presence or absence of a signal on the input line $X_{ft}$ may influence the adjustment of the respective weights $W_1, W_2, \ldots, W_i, \ldots, W_{ft}$, if the signal on input line $X_{ft}$ is selected as being within the inputs influencing the weight of a particular synapse. In this regard the signal on input line $X_{ft}$ is no different than the signal on any other input line within the selected set for a particular synapse. The adaptive weight circuit 150 is not connected to flow-through synapse 122 to change its weight $W_{ft}$ and the weight $W_{ft}$ remains a predetermined constant which may be, for example, 0.91.

Figure 4A:
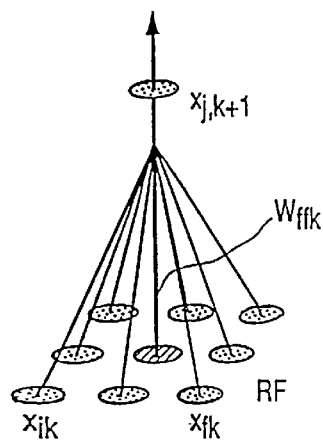
FIG. 4A is a conceptual illustration of a receptive field of a $k^{th}$ layer inputting to a flow-through synapse of a k+1 layer in which each flow-through synapse is shown in perspective as a solidly filled ellipse and each non-flow-through synapse is shown in shaded ellipse.

As illustrated in FIG. 4A, a receptive field RF utilizing a flow-through synapse in which each flow-through synapse is shown in perspective as a solidly filled ellipse and each non-flow-through connection, i.e., a 'collateral' connection, is shown in shaded ellipse. In FIG. 4A, the flow-through pathway is shown as a thicker, darker pathway $W_{ft}$ while the collateral connections are shown in lighter lines. As shown, the flow-through pathway $W_{ft}$ extends directly from one flow-through neuronal element in the kth layer to the next flow-through neuronal element in the k+1 layer while the collateral connections in the $k^{th}$ layer in the exemplary illustration extend from the neuronal element to the flow-through neuronal element.

Figure 4B:
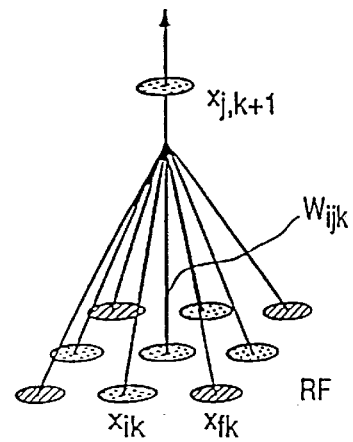
FIG. 4B is a conceptual illustration of a combination of flow-through and collateral neuronal elements but with collateral connections only at $x_{j,k+1}$.

In contrast, FIG. 4B illustrates a combination of flow-through and collateral neuronal elements of a receptive field in the $k^{th}$ layer providing collateral connections only to an adjustable collateral neuronal element in the k+1 layer; for the receptive field of the element with collateral connections only, any-number of connections from neurons with flow-through connections may exist. Thus, a neuron with a flow-through connection receives connections from input (receptive) fields of arbitrary size (either all positive, or center-on/surround-off) but only a single connection from a neuron with a flow-through connection. A neuron with only collateral connections also has an arbitrary size receptive field but may include many neurons with flow-through connections. Conceptually, the flow-through connections are analogues of pathways for unconditioned stimuli (UCS), and the collateral connections are analogues of pathways for conditioned stimuli (CS) because the weights for the synapses of the collateral connections can be varied in accordance with the learning rules illustrated herein. For pattern classification, the CS are the components of the pattern to be classified, the UCS are the desired classification.

Figure 4C:
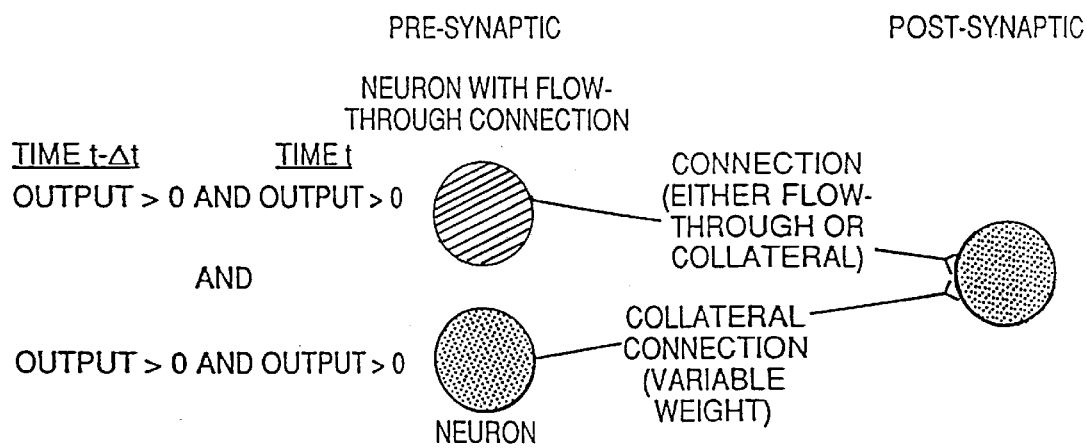
FIG. 4C illustrates the learning rule for neural combinations of flow-through and collateral connections for permitting weight increases.

The learning for a single architectural unit is illustrated in graphical form in FIG. 4C. As shown, the architectural unit includes a neuron with a fixed weight flow-through connection (FIG. 4) connected to a post-synaptic neuron through either a flow-through or a collateral connection and a neuron connected to the post-synaptic neuron through a collateral connection. At the synapse, the collateral connection knows the temporal relationships of the other connections synapsing on the same neuron, but has no information about any other connections or neurons, including the neuron upon which it synapses. As such, the learning rule does not depend on the firing history of the post-synaptic neuron. The connection weights of the collaterals are modified by the following rule: the weight of a collateral connection to a post-synaptic neuron is increased if, and only if, the collateral and the connections to that same post-synaptic neuron from neurons with a flow-through connection have both carried a signal two consecutive times (Time=t−Δt and time=t). The weight is not changed if the collateral connection has carried a signal twice successively and the connections to the same post-synaptic neuron from neurons with flow-through connections have not. Under all other combinations of circumstances, the weight associated with the collateral connection is decreased (i.e., the collateral neuron has not carried a signal twice successively). The rate of weight change is proportional to the difference between the current value of the weight and the extreme allowed values (usually 1 and 0) in the direction of the change, as described above.

FIGS. 5 to 8 illustrate an example of a neural network constructed of neuron circuits according to the present invention as illustrated in FIGS. 1 and 3. The neuron circuit 100 as illustrated in FIG. 1 is referred to hereinafter as a collateral neuron circuit, and the neuron circuit 110 as illustrated in FIG. 3 is referred to hereinafter as a flow-through neuron circuit. For simplicity, in the illustration of the neural network of FIGS. 5 to 8, each neuron circuit will be depicted as a circle; collateral neuron circuits 100 will be illustrated as shaded circles and flow-through neuron circuits 110 will be illustrated as filled circles. The associated connections between neuron circuits will be represented by lines terminated with arrows showing the direction of signal flow.

Figure 5:
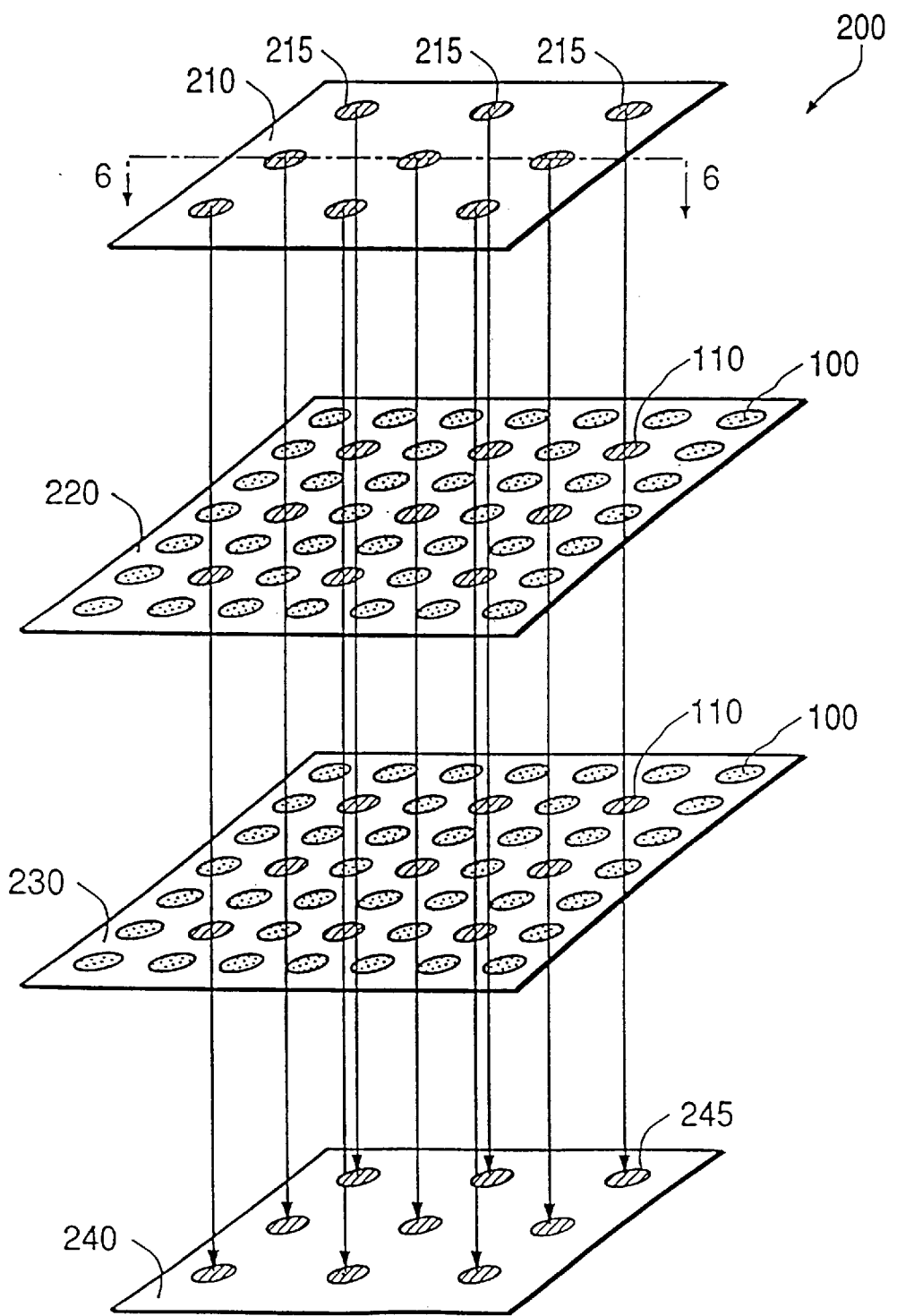
FIG. 5 is a partial schematic diagram of the architecture of a neural network according to the present invention with flow-through synapses shown and collateral synapses omitted for clarity.
Figure 6:
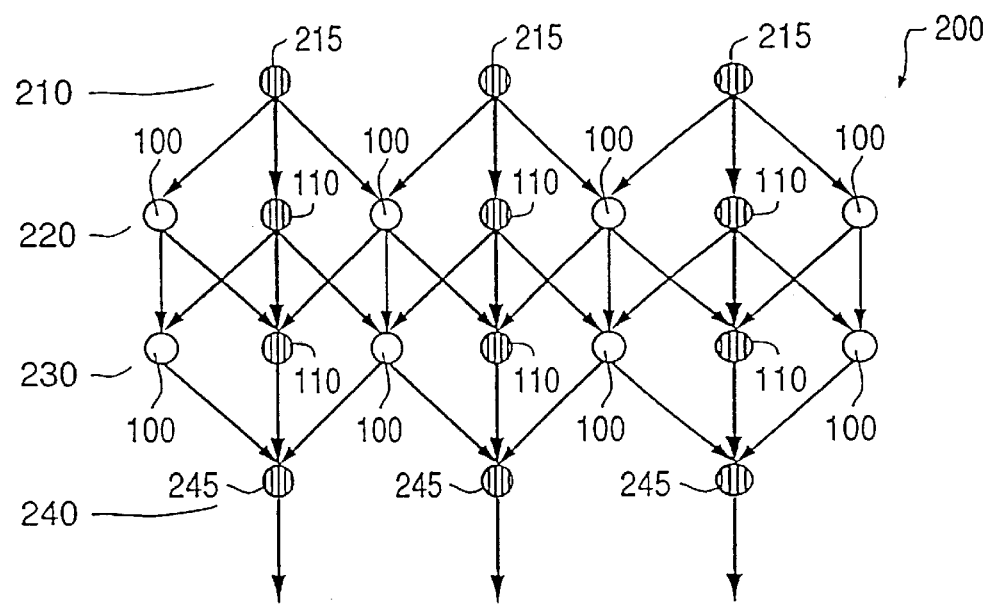
FIG. 6 is a sectional view taken along lines 6—6 of FIG. 5 with collateral synapses shown as open circles to illustrate the flow-through and collateral synapses connecting the layers of neuron circuits.
Figure 7:
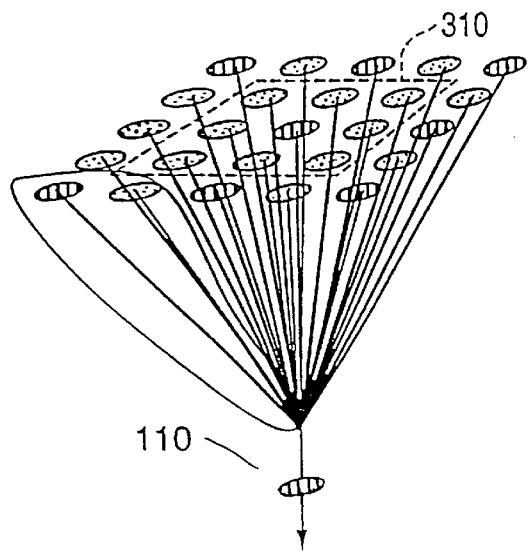
FIG. 7 illustrates the receptive fields of a neuron circuit with a flow-through synapse connection.
Figure 8:
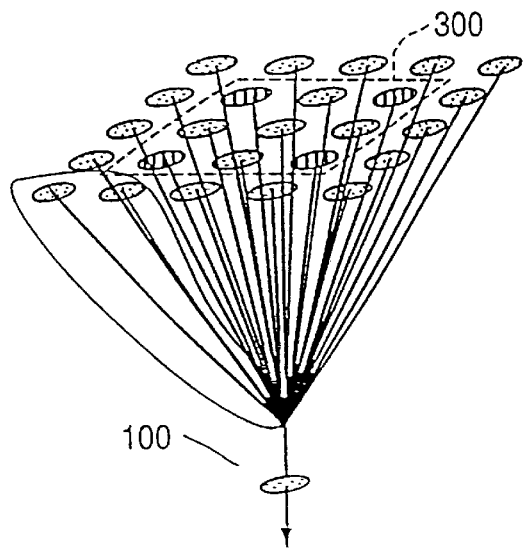
FIG. 8 illustrates the receptive fields of a neuron circuit without a flow-through synapse connection.

The neural network example of FIGS. 5 to 8 includes: a 3×3 array 210 of inputs: two 7×7 arrays of neuron circuits indicated at 220 and 230, each including both collateral neurons 100 and flow-through neurons 110; and one 3×3 array 240 of outputs. A simplified view of the overall structure of this example is illustrated in cross-section in FIG. 6 which shows the collateral and flow-through synapse connections between neuron circuits for the cross section marked 6—6 in FIG. 5. FIGS. 7 and 8 further illustrate the synaptic connections of the collateral and flow-through neuron circuits, respectively.

As shown in the partial perspective of FIG. 5, the architecture of the neural network, generally designated at 200, includes the array 210 of 3 rows and 3 columns of individual primary inputs 215. The input to neural network 200 is applied via this set of primary inputs 215. Output signals from the neural network are produced by the output array 240 which includes 3 rows and 3 columns of individual primary outputs 245. Two arrays 220 and 230 of neuron circuits 100 and 110 are interposed between the input array 210 and the output array 240. The arrays 220 and 230 each include 7 rows and 7 columns of neuron circuits. Each array 220 and 230 contains: nine flow-through neuron circuits 110, shown as solid circles: and 40 collateral neuron circuits 100, as represented by the shaded circles. The flow-through neuron circuits 110 are disposed in a 3×3 array which is embedded within the 7×7 combined array.

Flow-through neuron circuits 110 are connected via flow-through synapses (FIG. 5) to form continuous signal paths directly linking each input 215 to a corresponding output 245. Thus each flow-through neuron circuit 110 of array 220 has an input connected via a flow-through synapse to a corresponding input 215 of input array 210. In addition, each flow-through neuron circuit 110 of the second array 230 is connected via a flow-through synapse to a corresponding neuron circuit 110 of array 220. Lastly, the outputs of the flow-through neuron circuits 110 of the array 230 are connected to a corresponding output 245 of output array 240. Thus separate paths, including flow-through synapses and flow-through neuron circuits, links each input 215 to a corresponding output 245. For clarity, only connections via flow-through synapse arrays 210, 220, 230, and 240 are shown, with all collateral connections omitted.

A cross-sectional view of the neural network 200 taken along line 6—6 of FIG. 5 is shown in FIG. 6. The connections between neuron circuits via the flow-through synapses are denoted by relatively thick lines as also illustrated in FIG. 5. The remaining connections within the neural network 200 are via collateral synapses and are represented by the relatively thinner lines. Collateral synapses connect primary inputs 215 to input lines of collateral neuron circuits 100 in the first array 210. Collateral synapses connect the output lines of both collateral neuron circuits 100 and flow-through neuron circuits 110 in the first array 220 to single input lines of both collateral neuron circuits 100 and flow-through neuron circuits 110 in the second array 230, respectively.

The typical receptive field of a flow-through neuron circuit 110 is illustrated in FIG. 7. The receptive field consists of a 3×3 array 310 of neuron circuits located in a previous array (within the dashed squares). A single connection via a flow-through synapse is provided from the output of a flow-through neuron circuit 110 of the prior layer: all other links are via collateral synapses. All collateral synapses linking the neuron circuits in the receptive field are excitatory, i.e., their weights have positive values preferably within the range from 0.0 to 1.0. As indicated above, the flow-through synapse has a predetermined fixed weight near the maximum allowable weight, i.e., 0.91.

The typical receptive field of a collateral neuron circuit 100 is illustrated in FIG. 8. The receptive fields consist of a 3×3 array 300 of neuron circuits located in a previous array (within the dashed squares) with all connections made via collateral synapses. All these collateral synapses are excitatory, i.e., their weights have positive values preferably within the range from 0.0 to 1.0 with the set point for the weight determined during training.

In this embodiment of the invention, both the flow-through neuron circuits 110 and the collateral neuron circuits 100 within the second array 230 (FIGS. 5 and 6) each have receptive fields containing sixteen additional neuron circuits disposed adjacent to the outside border of the dashed squares as shown in FIGS. 7 and 8; these additional connections are via inhibitory collateral synapses. FIGS. 7 and 8 each illustrate only two such connections for reasons of clarity. The weights of the inhibitory collateral synapses are negative and range in value from 0.0 to a "maximum weight" of preferably −0.5. In the preferred embodiment of the present invention, the extra connections via inhibitory synapses have been found to increase the training efficiency of the neural network 200, but in this and other embodiments having larger arrays of neuron circuits, there is no requirement that extra connections via inhibitory synapses be included.

The typical use of a neural network of the type 200 disclosed is for recognizing whether a pattern belongs to a class of patterns having common characteristics. The first step in training initializes the weights of all the collateral synapses to values near their minimum. In the preferred embodiment, excitatory collateral synapses are given initial values of 0.10, while inhibitory collateral synapses are given initial values of −0.10. All the flow-through synapses have fixed weights near the maximum weight, for example, 0.91. This value is set so that the inputs will not propagate to the outputs without additional stimulation from the to-be-trained collateral neuron circuits, that is, neuron circuits not on the flow-through path. After initialization is completed, the neural network 200 is ready for training.

Training takes place by successively applying to the primary inputs 215 sets of signals derived from patterns having common characteristics. These sets of signals can be groups of either analog or binary values derived from patterns belonging to a class having common characteristics. Examples include sets of binary values representing the black and white pixel levels from pictures of the same object taken at slightly different angles or corrupted by noise, and sets of analog values sampled from voice waveforms obtained from different persons speaking the same work or group of words. For each application of a signal set to the primary inputs 215, the weight of each collateral synapse is modified by the adjustable weight circuit 150 for the neuron circuit. This successive application of the signal sets takes place for a sufficiently long period of time for the collateral synapse weights to converge towards and achieve relatively stable values. These relatively stable values will be dynamically stable, i.e., changing with the presentation of the set of input signals without any net change over the whole of the set.

A plot of the value of a weight for a typical excitatory collateral synapse as a function of the number of successive signal sets presented to the primary inputs was obtained from a computer simulation of a neural network representing the example described above in relationship to FIGS. 5–6. The set of signals sequentially presented to the primary inputs consisted of three input sets. The first two sets were identical and were derived from an image having 3×3 pixels, each pixel having a value ranging from 0 to 1, while the third set was a null set containing 3×3 pixels, all having values of 0.0. When these three input signals sets were continuously and sequentially presented to the primary inputs, the weight of a typical collateral synapse in the neural network converged towards and reached dynamic equilibrium in which weight increases and weight decreases over the set of patterns are equal, and no net weight change occurs. When the weights of all collateral synapses in the neural network reach this dynamically stable equilibrium state, the neural network is said to be trained to recognize the patterns represented by the set of input signals successively presented to the primary inputs. At equilibrium, the weights fluctuate between limits that are determined by three system parameters: (1) the maximum allowed weight ($W_{max}$), (2) the learning increment, a, and (3) the weight decrement, b, together with the specific input signals and their order of presentation, i.e., their temporal associations. The set of responses on the primary outputs 245, then represent the mean pattern of the collective group of patterns used in training.

Use of neuron circuits with a training rule of the present invention results in several advantages over the prior art. Firstly, the training rule is local to each neuron circuit, requiring no global error signal or measure for training. This results in improved learning performance of the neural network. If the neural network is embodied in a computer simulation, then the amount of computation required expands linearly with the number of synapses needed to connect the network. Computer simulations of neural networks employing learning rules in accordance with the prior art scale at a rate greater than linearly with the number of synapses. Similarly, for neural networks embodied in parallel hardware the number of interconnections required for teaching the network increases linearly with the number of synapses. This greatly reduces the number of interconnections as compared to the prior art. Thus the present invention enables increasing the size of the neural network with a lesser degree of additional effort. Because many problems require neural networks of hundreds or thousands of neuron circuits, this scaling factor can be a significant advantage in many applications.

The embodiments described above in the context of FIGS. 1–8 are effective in learning correlations; a further progression of embodiments, referred to herein as the generalized embodiments, is developed in FIGS. 9–14.

The generalized version of the neural network incorporates (1) the separation of the unconditioned stimuli and conditioned stimuli pathways into two separate input streams, (2) 'interneurons' that allows the system to learn anti-correlations as well as correlations among input signals, and (3) the implementation of dendritic "patches" that model the local interaction of unconditioned stimuli (UCS) and conditioned stimuli (CS) pathways during associative learning.

In order to implement these features, the pathway for the unconditioned stimuli pattern is separate and distinct from the pathway for the conditioned stimuli pattern, and, in order to induce associative learning, the unconditioned stimuli pattern is presented together with the conditioned stimuli pattern (each to their own input neurons). After the association has been learned (and in exact parallel with Pavlovian conditioning), presentation of the conditioned stimuli input alone will elicit, as the output of the network, that unconditioned stimuli with which that conditioned stimuli has previously been associated.

Figure 9:
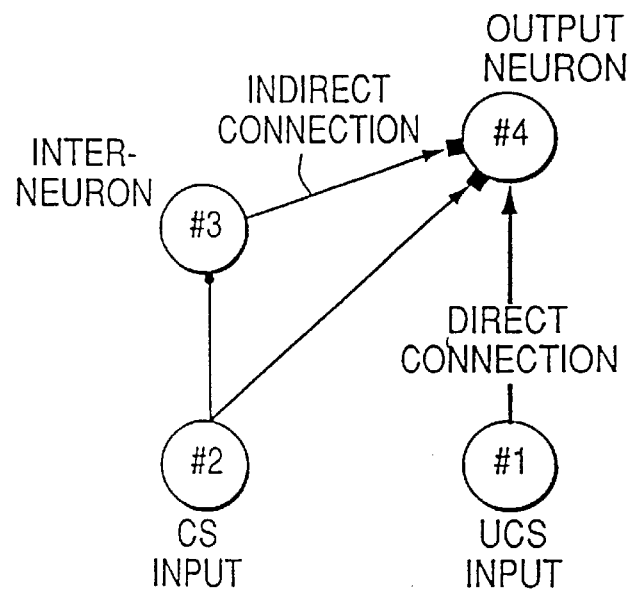
FIG. 9 is an illustration of the basic architectural unit of a preliminary version of the neural network for learning both correlations and anticorrelations.

The basic architectural unit of the preliminary generalized network, consisting of the separate unconditioned stimuli and conditioned stimuli pathways along with the indirect connection, is illustrated in FIG. 9. As shown, the relatively thicker vertical connection from neuron 1 to the output neuron 4 represents a flow-through connection from the unconditioned stimuli input (neuron 1); the relatively thinner lines represent collateral connections from the conditioned stimuli input (neuron 2); neuronal elements 3 and 4 have spontaneous firing activity. The arrow-tipped lines represent excitatory connections, the circle-terminated lines represent inhibitory connections, and the squares represent 'patches' whose sign is determined during training by the signal in the flow-through (unconditioned stimuli) connection from the unconditioned stimuli input. This apparent ambiguity of sign is a computationally effective method of restricting attention to active patches, as described below, and does not imply or represent a change in function of an existing synapse.

To permit the network to learn the patterns of its input signals, rather than learning the signals from each individual input, "patches" on the "dendritic membrane" have been introduced with each patch reflecting a pattern of activity on the input neurons. Patches are where synapses are located. Weights are generally associated with each patch rather than with each connection and represent how often the patch has been used. Interneurons are deleted in more sophisticated embodiments.

Figure 10:
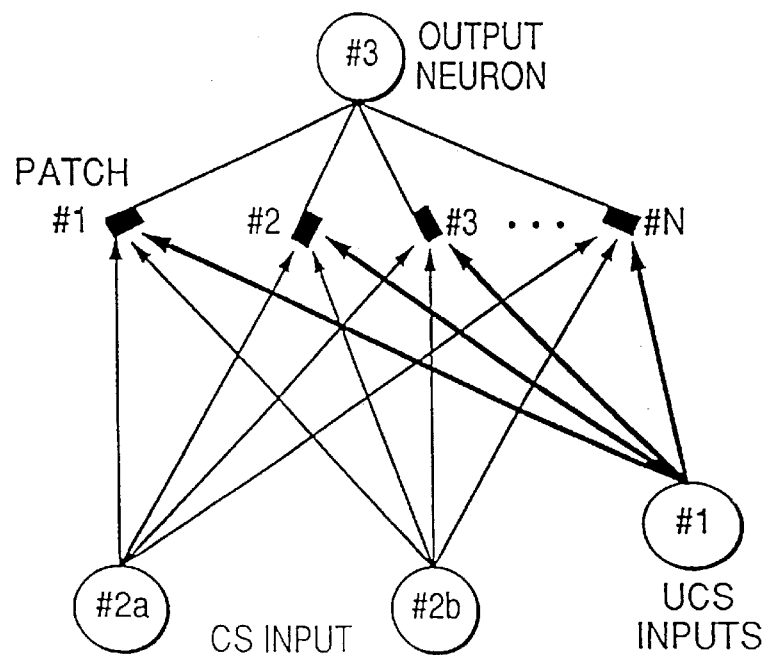
FIG. 10 illustrates the basic architectural unit of a generalized network with two conditioned stimuli inputs, and unconditioned stimuli and output neuron, and showing 1, n patches in which the interneuron of FIG. 9 has been subsumed into patches.

To illustrate the differences between the original network of FIGS. 1–8 and the generalized version of the network (FIGS. 9 and 10) and present the concept of patches, a generalized network with two conditioned stimuli inputs, neurons 2a and 2b are shown in FIG. 10.

The introduction of patches permits recognition, and therefore separation, of the patterns of incoming signals, i.e., recognition of which independent combination is being activated. These independent patterns have been termed herein as a "patch" as an analogy to the synaptic patches believed to be formed on branches of the dendritic tree of vertebrate neurons. Consequently, the weight associated with learning is now assigned to the patch as a whole, rather than to each incoming connection. By explicitly defining patches, the input signal is compared to all possible patch patterns, and the patch whose stored pattern is most similar to the input signal carries the signal.

An illustrative method is used for determining the patch that carries the signal when indirect connections are used (FIG. 9) where each patch i as shown in FIG. 10 is described by a binary vector $P_i(n)$, where n is the index on the neurons that provide input to the patch, and $P_i(n)=1$ if the signal came from the direct connection, and $P_i(n)=-1$ if the signal came from the indirect connection.

The input signal is represented by the continuous-valued vector x(n) where n is the index on the neurons providing input to the patch and x(n) may be any value between 0 and 1. If x(n) is small, then the spontaneously active interneuron is not inhibited and the signal on the indirect connection is large. The signal on the indirect connection is represented as S(x(n)) or s(n). If SF is the level of spontaneous firing activity and g(Z) is as defined above, then s(n)=g(SF−x(n)).

To calculate the degree of mismatch, a binary representation, D(n), of the input signal must be calculated:

D(n)=1 if x(n)>s(n) (the direct connection carries the signal), and

D(n)=−1 if x(n)<s(n) (the indirect connection carries the signal).

The degree of mismatch for a patch i may be calculated as the Hamming distance between D(n) and $P_i(n)$ and the most similar patch i, and thus the patch that carries the signal is that patch with the smallest degree of mismatch. In the event of a tie, the sum of $(x(n))-s(n)^2$, for those n for which $D(n) \neq P_i(n)$, is calculated and the patch with the smallest value is selected as the most similar.

An alternative method of determining the most similar patch is to calculate a value termed herein as the degree of match, DM, as follows:

$$DM_i = \sum_n [P_i(n) * (x(n) - s(n))]$$

The degree of match is a function of the absolute difference between s(n) and x(n). For each n, if $D(n)=P_i(n)$ then the absolute difference between s(n) and x(n) is added to the total, if $D(n) \neq P_i(n)$ then the absolute difference is subtracted from the total. Pearson's r, a correlation coefficient well known to those of skill in the art, may be used as a similarity measure for gray scale inputs. When indirect connections are not used (FIG. 10) the degree of match and degree of mismatch may be calculated directly, without computing a binary representation of the input.

A computational simplification is introduced by not storing all possible 2N patches (where N is the upper limit of n, the number of neurons providing input to the patch); instead, only patches that are needed (whose number is a function of the specific unconditioned stimuli and conditioned stimuli inputs) are stored by the network. When a new signal is presented on the input, the pattern of activation is compared to existing patches. If the new signal is similar to an existing patch (the degree of mismatch is smaller than the "patch creation threshold"), then the signal is carried by that patch and its weight is changed. If the new signal is not similar to an existing patch, a new patch is stored. Repeated presentations of the same (or a similar pattern) causes the weight associated with the patch to increase. Patches which carry signals frequently have high weights, whereas weights are low on patches which carry signals rarely. An additional far-reaching consequence of the introduction of patches is that, without any additional complications, it eliminates both of the problems associated with memory capacity that plagues other artificial neural networks. It permits the storage of very large number of patterns, and these patterns need not be orthogonal.

The network of FIG. 10 can be expanded to learn to associate images, because the number of conditioned stimuli inputs is independent of the number of unconditioned stimuli inputs, allowing the network to associate a large image with a much smaller representation or vice versa.

Additionally, the network can be trained as an auto-associator, by presenting the same pattern to both the unconditioned stimuli and conditioned stimuli pathways, or as a hetero-associator, by presenting different patterns to the unconditioned stimuli and conditioned stimuli pathways. In both auto- and hetero-association, both the conditioned stimuli and unconditioned stimuli inputs may be noisy. By configuring the unconditioned stimuli input appropriately, a network trained as a hetero-associator can be made to function as a pattern classifier.

An improvement on the basic patch concept, is to vary the radius (size) of patches. Variable radius patch creation, is a method of creating patches that more efficiently covers the hyperspace formed by the set of input patterns. It allows the system to create more "small" patches where needed to distinguish similar CS patterns that have different UCS values associated with them, but use a few "large" patches where all similar patterns have the same UCS value. This means fewer patches for most problems and the potential for better results where patterns of different kinds have subtle differences.

Figure 11:
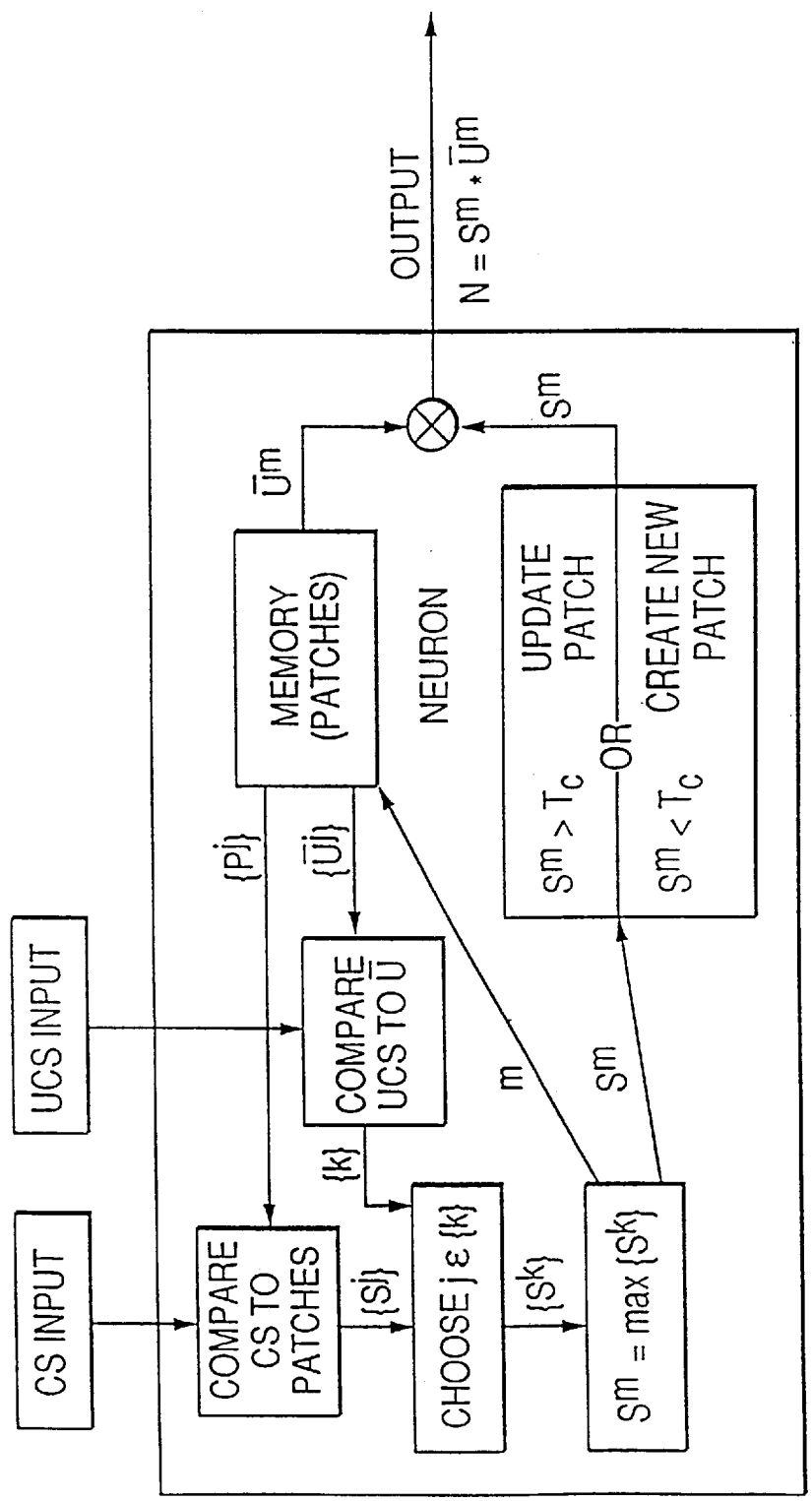
FIG. 11 is a flow diagram of the operation of a single neuronal element in the neural network system.

The simplest form of variable radius (convoluted boundaries) patches employs no thresholds. When a pattern is presented, the CS values are compared with the stored CS values for all patches and the most similar patch ($P^{mo}$) is determined. If the UCS value of that patch ($U^{mo}$) matches the input UCS value, that patch ($P^{mo}$) is updated. Otherwise, a new patch is created. (FIG. 11)

Figure 12:
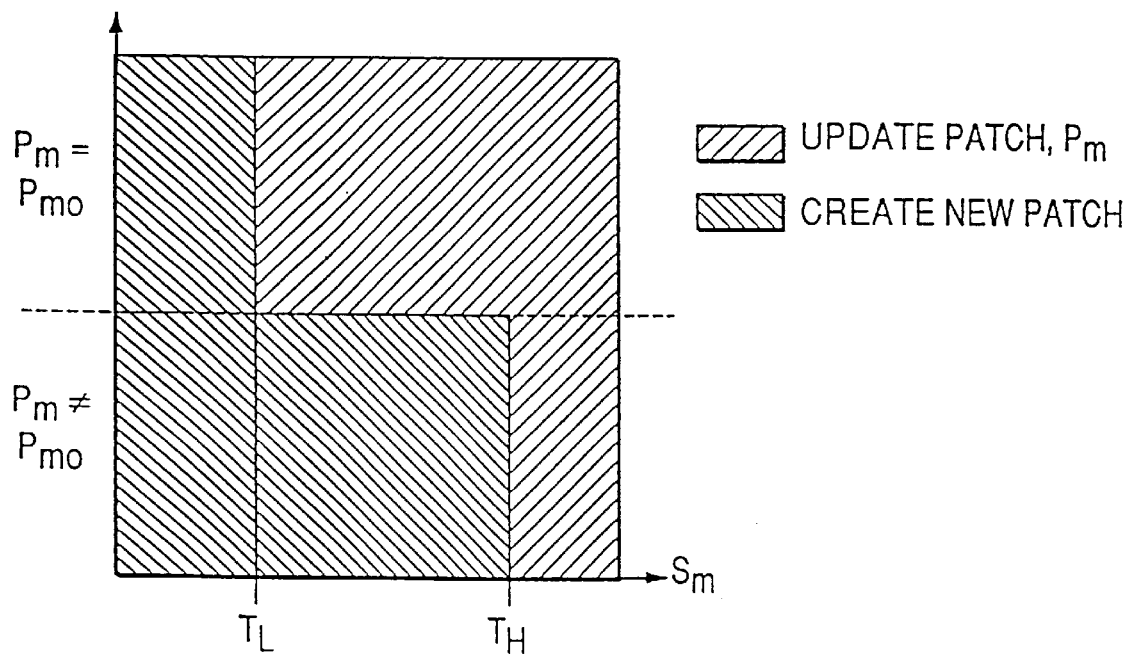
FIG. 12 is a decision space for variable size patch creation using thresholds. If the similarity ($S^m$) of the incoming CS pattern to the most similar patch with a matching UCS value ($P^m$) exceeds $T_H$ then that patch is updated. If $S^m$ is less that $T_L$ then a new patch is created. If $S^m$ is between the two thresholds, then a new patch is created if $P^m$ is not most similar patch overall, $P^{mo}$.
Figure 13:
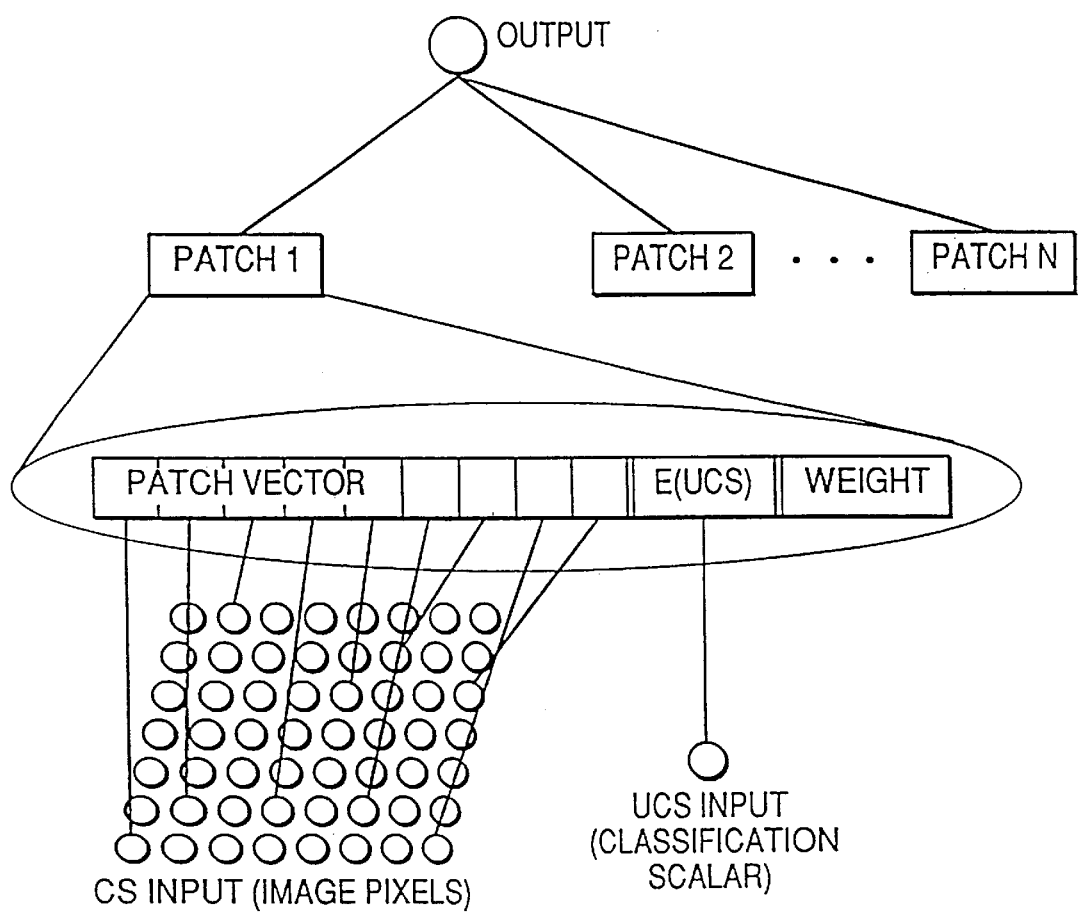
FIG. 13 is a schematic representation of a single output neuron and its associated patches. Each patch consists of the patch vector, the expected value of one component of the UCS, and a frequency of use based weight. Each output neuron has many patches and the CS and UCS inputs are connected to the output neuron via the patches.

To allow for finer control over the maximum and minimum sizes of patches, two thresholds are introduced. The most similar patch ($P^M$) with a matching UCS value is determined. The similarity ($S^M$) between the incoming pattern and pM is calculated. One threshold ($T_c$) limits the maximum size a patch can have. This ensures that a new patch is created if the input pattern is not sufficiently similar to any existing patch. That is, if $S^M < T_L$, a new patch is created. The other threshold ($T_H$) prevents over-crowding of patches. It prevents a patch from being created if it is almost identical to an existing patch with a matching UCS. If $S^M > T_H$, $p^M$ will be updated rather than creating a new patch. If the similarity lies between the two thresholds, patch creation depends on $U^{mo}$. A patch is created only if the expected value of the most similar patch does not match the incoming UCS. FIG. 12 illustrates this relationship. By setting these thresholds to the same value, the neural network system would behave as if without variable size patches (with a patch creation threshold $T_c$ equal to the thresholds' value: $T_c=T_L=T_H$) as illustrated in FIG. 11. A general patch structure is shown in FIG. 13.

Other enhancements to a neural network, that permit a patch to modify its own receptive field, are "pruning" and "budding." An output neuron has associated with it a receptive field, i.e., those components of the CS input that are connected to the output neuron. In a simpler embodiment disclosed herein, when a patch is created, it inherits the neuron's receptive field and is unable to modify its receptive field. As described in subsequent paragraphs, receptive fields may be altered.

"Pruning" is a method of eliminating unnecessary connections to a patch. This effectively reduces the size of the receptive field for patches and allows patches to have a customized receptive field. If a connection to a patch varies significantly while the patch is active (relative to the variability of the input value overall), that connection is removed from the patch's receptive field. Thus, future determinations of whether there is a match for a patch will ignore the incoming signal on that connection. The idea is that a connection which varies considerably while a pattern is matched is not part of the distinguishing characteristics of that pattern. It is more likely some sort of noise. In some cases, inputs that would result in multiple patches without pruning may be combined into one pruned patch (which ignores the noise that previously forced the network to create multiple patches). Thus, ignoring these inputs saves computation time and is expected to improve network performance by avoiding the noise which might cause an inaccurate classification.

"Budding" is another method of optimizing the number of connections to a patch. While pruning requires an initial large number of connections which can then be reduced, budding allows the initial number of connections to be small and causes connections to be added as appropriate. With budding, a patch is defined as having an "active area" of its receptive field. The active area is the group of connections which are compared with the patch values to determine whether a patch is matched (in other embodiments, the comparison was made on the entire receptive field, in this alternative embodiment comparison is made on a subset thereof). When each pattern is presented, an active area of the input pattern is selected. Methods for choosing the active area include using the bright, unusual, or recently changed areas of the inputs, depending on the nature of the input and the goal of operating the system. It may be desirable to limit the active areas to the spatially connected areas in the input pattern. A patch with this active area is created if there is not already a similar patch (similar both in which locations of the input pattern make up the active area and in the CS values in the active area, as well as UCS value). In addition, each patch is compared with the incoming pattern of CS values. This comparison uses only the connections in the patch's active area. This may cause one or more patches to be updated and/or a new patch to be created. Whenever a patch is matched, the variability measure (the same value used in pruning above) is updated for all connections in the receptive field (not just in the active area). If a connection outside a patch's active area has a low enough variability, it becomes part of the active area. "Budding" could be combined with "pruning" to remove any connections accidentally left in the active area. Pruning could remove connections from the active area. By allowing the active areas to form entirely dependent on the input data, more useful views of the data may be formed (such as feature detectors).

FIG. 13 illustrates a single output neuron and its associated patches. Groups of these neurons form a layer of a neural network.

Figure 14:
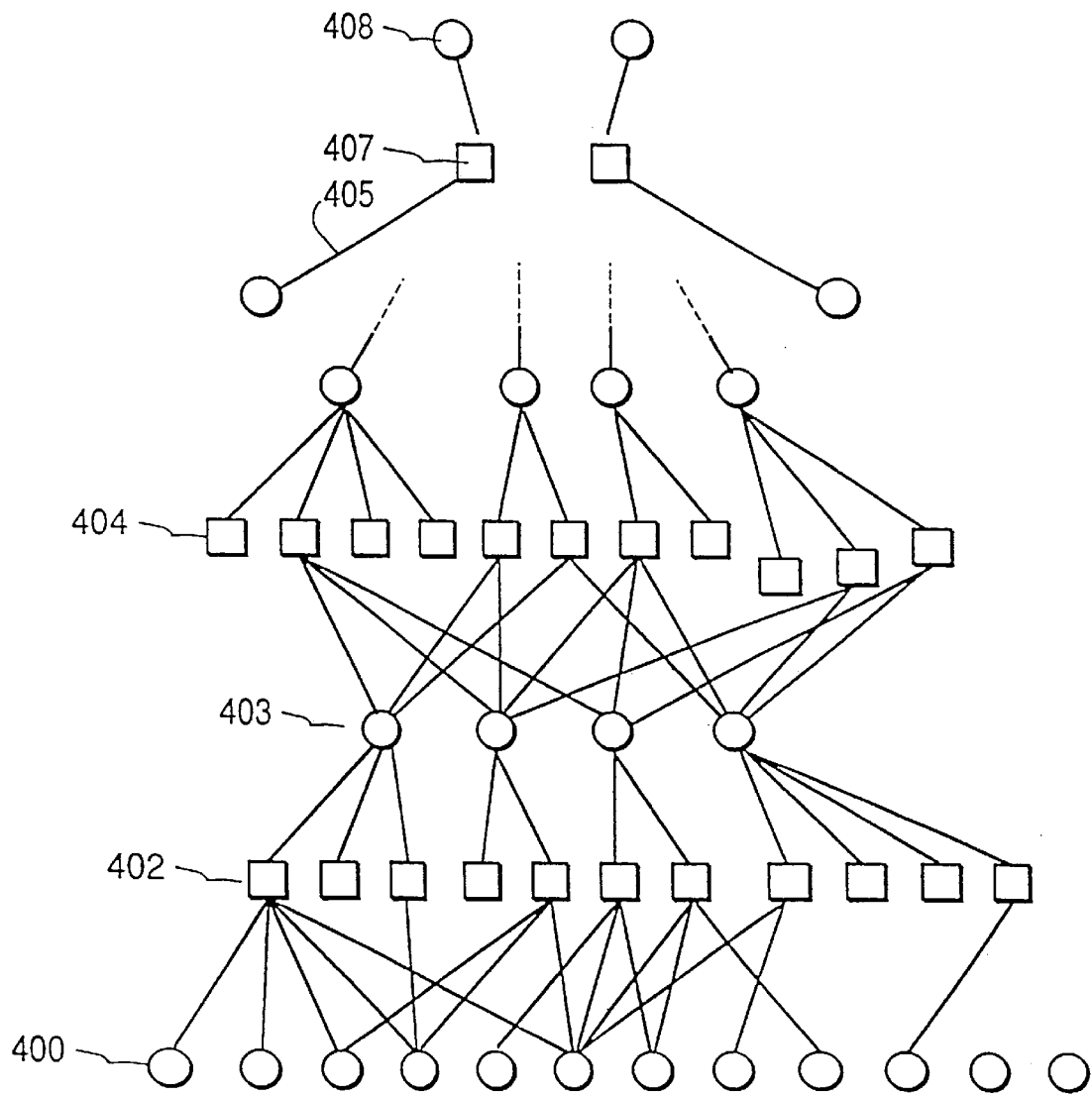
FIG. 14 is a schematic illustration of a multilayered (multi-subnetworked) neural network.

In a preferred embodiment, FIG. 14 shows a multi-layered (multi-subnetworked) network. The first subnetwork is constructed such that UCS inputs are eliminated or, equivalently, all UCS inputs are set to the same value irrespective of the class of training exemplars. When patches are formed as described herein, the patches will reflect only the similarity of CS patterns, independent of their classification. If the receptive fields are chosen in such a way that each receptive field is but a portion of the complete input pattern, then the patches will record, and respond to, similarities in the portion of the input field to which they are attached, that is similarity of "features" within that portion of the field. Consequently, the output neurons of the first layer 403 transmit not the product of the most similar UCS with the similarity measure, but rather a pair of numbers: the identification of some subset of patches (depending on their associated similarity measure), and, optionally, the similarity measure, as input to the second layer 404.

The second subnetwork of the network has, in this embodiment, an input field large enough to equal the total number of output elements on all the neurons in the subnetwork below, and a number of output elements equal to the number of components in the input UCS. The input to the second subnetwork will consist of the identification of each sufficiently well matched patch of the preceding subnetwork and, optionally, value of the similarity measure for each patch, presented on the input line corresponding to that patch; the classifying UCS is presented to the UCS input of the second subnetwork.

The advantages of this two subnetwork system each with two layers, network include:

1. The first layer generates fewer patches because similar CS inputs do not form different patches. Similar features are sought across classes. This is a particularly significant advantage when the application to which the method is directed contains a large number of classes (such as the identification of 4000 different hand-written Japanese Kanji characters).

2. The second layer, which performs the actual classification function, classifies not on the basis of the entire image or components thereof, but rather on the basis of features clustered by the patches generated in the first layer. Thus, common features among classes can be identified by examination of the first layer clusters and which features group to identify specific classes can be determined by examining the clusters of the second layer.

The size of the receptive field on the second layer may be too large for efficient operation if it is constructed according to the principles outlined above. If problems occur, the following remedies may be applied:

1. If temporally mixed training and testing are not required (i.e., in a temporally stationary environment), the first layer can be trained first without training the second layer. Thus, when training of the first layer is complete, the distribution of patches among the first layer output neurons and their numbering is known, as is the similarity measure with respect to the training set. A decision can then be made to limit the connections to the second layer to some subset of the first layer patches with the highest similarity measures across the training set.

2. A preferred, modification consists of using the pruning option disclosed herein. In this implementation, connections from the first layer to the second are pruned on the basis of their variance with respect to the UCS-specific signal. Thus, an appropriate number of unnecessary connections between the layers is removed.

3. Alternatively, budding (as disclosed herein) may be employed to start the development of second layer patches with only those connections reflecting the least variance with respect to the UCS, and adding additional, higher variance connections, as needed to improve classification performance.

Another view of FIG. 14 is that it illustrates the extension of the system shown in FIG. 13 to a multi-subnetworked system wherein there is an input 400 in the first layer (first subnetwork) from conditioned stimuli, and that input is transmitted to a series of patches 402 which, as in the basic layer unit of FIG. 13, connect to output neurons 403. A difference between the multilayered system and the simpler system at the entry layer is that there are either no unconditioned stimuli or that they are all set to the same value so that, in effect, the processing is independent of unconditioned stimuli.

The output of the first subnetwork is used as the input layer of the successive layer (second subnetwork). The output 403 of the first layer is the input of the second layer. This input may be transmitted to patch elements 404 of the second layer. However, the patches may be linked to a plurality of output neurons from the first layer 403. Viewing the system from the output neurons of the second subnetwork, there may be signals from a plurality of output neurons in subnetwork 1 to patches connecting to an individual neuron output of subnetwork 2.

This pattern of interconnecting subnetworks may extend for n subnetworks, where n is determined by the particular circumstances of the problem being addressed. Not only can n subnetworks be placed in series, but m of such series networks (each with a different n, if desired) can be placed in parallel, finally converging on the nth (final) output layer, with its associated USC 405.

At the nth subnetwork, input from unconditioned stimuli 405 is also provided in the usual way as shown in the basic network of FIG. 13, i.e., one component of unconditioned stimuli is provided to each patch. The final output of the nth output neurons is shown as 408 in FIG. 14, the final patches as 407. Multi-subnetworked systems may be connected in series and/or parallel.

The present invention advantageously provides a dynamically stable associative learning neural network system that associatively learns both correlations and anti-correlations, that can be configured to classify or restore patterns simply by changing the number of output units, in which the computational effort scales linearly in complexity with the number of connections, and in which neither global nor local feedback connection are required during learning.

As will be apparent to those skilled in the art, various changes and modifications may be made to the illustrated dynamically stable associative learning neural network system of the present invention without departing from the spirit and scope of the invention as determined in the appended claims and their legal equivalents.

The following examples illustrate various applications of the neural network system:

EXAMPLE 1

Patch Creation; Training and Testing

For either fixed or variable method of patch creation, the patch, $P^m$, whose similarity, $S^m$, is greatest is "activated" and all three parts of the patch (vector, expected UCS and weight, FIG. 13) are modified. The patch vector is modified to increase its resemblance to current CS pattern by calculating a running average of all the CS inputs that are similar to the patch:

$$P_i^m(t) = \frac{(t-1)P_i^m(t-1) + I_i}{t} \quad (1)$$

where t is the number of patterns that have activated the patch and $P_i^m(0)=0$. For a new patch, t=1; thus the patch vector for a new patch equals the CS input. As t increases, the effect that a novel CS input pattern has on the patch decreases. Therefore, patch movement eventually ceases for stationary distribution of inputs. The final patch vector is the average of similar valued CS inputs.

The expected value of the UCS, $U^m(t)$, is also a running average of UCS inputs associated with similar valued CS inputs:

$$U^m(t) = \frac{(t-1)U^m(t-1) + UCS}{t} \quad (2)$$

where $U^m(0)=0$. For a new patch, t=1; thus the expected value of the UCS for a new patch equals the UCS input. The weight, $W^m$, reflects the frequency of utilization of the patch. The weight of the most similar patch is incremented according to learning rules:

$$W^m(t)=[1-W^m(t-1)]*a+W^m(t-1) \quad (3)$$

where a is the learning increment and $W^m(0)=0$. The weight of all other patches is decremented according to those same learning rules:

$$W^k(t)=W^k(t-1)*(1-b) \quad (4)$$

where b is the learning decrement. The weights exhibit a monotonic convergence to their equilibrium value. Furthermore, it follows from equations 1 and 2, respectively, that the patch vector and expected value of the UCS also reach steady state values.

The output of a neuronal element equals the product of $S^m$, the similarity between the CS and the most similar patch, and $U^m$, the expected value of the UCS of the most similar patch:

$$N=S^m*U^m \quad (5)$$

N generally ranges from −0.5 to +0.5. If there is negative correlation between the CS and the patch ($S^m<0$, a condition that may occur during testing), then the neuronal output has a value of 0. Unlike other networks, the weight is not used in the computation of the output of a neuronal element. The weight is used in patch merging and patch deletion, two mechanisms whose function is to reduce the number of existing patches.

The system incorporates two ad hoc mechanisms, patch merging and patch deletion, designed to reduce the number of patches retained by each neuronal element. These are computational mechanisms whose purpose is to reduce the storage requirements of the network.

Patch merging combines two similar patches into a single patch. Two patches may become similar as a result of two dissimilar patches "moving" toward one another. The similarity between two patches is determined in the same fashion as the similarity between a patch and the CS input:

$$S^{jk} = \text{corr}(P^i, P^k) = \frac{\sum_i (P_i^j - \overline{P^j})(P_i^k - \overline{P^k})}{\sqrt{\sum_i (P_i^j - \overline{P^j})^2 \sum_i (P_i^k - \overline{P^k})^2}} \quad (6)$$

Two patches are considered similar if $S^{jk}$ is greater than some patch merging threshold, $T_m$, and if the UCS associated with the patches are similar (e.g., the difference between the two UCSs is less than half their range). Patches are merged by replacing the two patches with one patch which has (a) a weighted average of the two patch vectors:

$$P_i^k(t) = \frac{W^j * P_i^j(t-1) + W^k * P_i^k(t-1)}{W^j + W^k} \quad (7)$$

(b) a weighted average of the two UCS values:

$$U^j(t) = \frac{W^j * U^j(t-1) + W^k * U^k(t-1)}{W^j + W^k} \quad (8)$$

(c) and a weight approximating the sum of the frequency of use of the patches. A power law approximately relates the frequency of use (f) to the weight (f=$W^\alpha$, where $\alpha$ is a function of the learning increment and decrement.) Therefore, the new weight is given by:

$$W^j(t) = [W^j(t-1)^\alpha + W^k(t-1)^\alpha]^{\frac{1}{\alpha}} \quad (9)$$

The second mechanism, patch deletion, removes patches whose frequency of use is very low. All patches whose weight, $W^j$, is greater than a patch retention threshold, $T_R$, are retained; all patches whose weight has decayed (Equation 4) to less than the patch retention threshold, are removed.

EXAMPLE 2

Application of the Neural Network System to Pattern Completion

This example demonstrates the pattern completion capabilities of the neural network system. Pattern completion is a special case of classification in which the number of input units are equal to the number of output units, and an input/output relationship is defined on a pixel by pixel basis.

A training set consisted of the letter E, A, O, Q, each letter in four different fonts.

Each letter consisted of a 19×19 pixel binary array. The receptive field to each of the output neurons was a 13×13 pixel subset of the input field.

Training consisted of presenting one exemplar of one of the four letters chosen at random to the CS input, and another random exemplar of the same letter to the UCS. Using this training paradigm repeatedly, the network learned to generalize across fonts.

A testing set was generated by adding multiplicative noise, that is randomly changing bits in the input patterns. Flipping 30 percent of the bits produces patterns with a signal-to-noise ratio of 1.75:1 (note that flipping 50 percent of the bits results in a completely random pattern). The output is not a representation of any one of the four fonts, but rather the generalized characteristics of each letter as learned by the neural network system. In tests where human observers were not shown the neural network system output corresponding to the test set, none could correctly identify more than six of the eight test letters, and most could identify correctly less than four of the eight, yet the network can reconstruct universally recognizable letters from each of the eight inputs.

EXAMPLE 3

Use of the -Neural Network to Classify Hand-written Digits (ZIP Codes)

This example illustrates the use of the neural network system of the present invention to classify segmented, rectified, hand-written digits. It also includes a comparison of the variable size versus the constant size patch creation.

Hand-written ZIP codes were segmented into single digits and scaled to fill a 22×16 array. The scaled digits were rotated to all be in approximately the same orientation.

The small set of digits was randomly divided into a training set containing 976 digits and a testing set containing 943 digits. The large set of ZIP code digits was divided into a training set of 2000 digits (200 of each kind) and a testing set of the remaining 8964 digits. Some of the experiments used the 22×16 bit-mapped digit. For other experiments, the CS data set was transformed using principal component analysis [Rubner et al., 1990, Hyman et al., 1991] to demonstrate the neural networks system's performance on continuous-valued inputs. For all experiments, the UCS pattern was a 10 bit classification vector in which the nth bit (n=0, . . . 9) was 1 for digit n and all other bits were 0 .

A decision rule is required to evaluate the continuous-valued output vector and determine the neural network system's performance. The value 0.5 is added to the output of each neuronal element, to force the range of output values between 0 and 1. Thus, the value of 0.5 results when there is no similarity ($S^M$=0) between the CS input and a patch. If the value of only one of the output elements was greater than 0.5, the pattern was considered classified by the network, otherwise (i.e., no value over 0.5 or more than one value over 0.5) the pattern was considered un-classified because the output was not similar to any UCS presented to the network during training. The pattern was considered correctly classified if the nth output element was the only element with an output above 0.5 when digit n was presented is the input, otherwise a pattern was classified incorrectly.

The first experiment used the small set of bit-mapped digits and a method of constant size patch creation. For this experiment the neural network system was configured using random receptive field connections. The CS input field was a 22×16 array; the UCS input field was a 1×10 array and the output field was a 1×10 array of neuronal elements. Each output neuronal element was connected to a randomly chosen subset of the inputs. As shown in FIG. 13, the inputs are actually to patches on either output element. The number of randomly chosen inputs connected to each output neuronal element is varied to evaluate the effect of the number of connections on performance. The patch vectors are stored as 4 bit approximations to the real value to reduce storage requirements.

The network was trained by presenting each pattern in the training set once (increasing the number of pattern presentations did not change performance.) The order of pattern presentation was random. Each presentation of the CS pattern was accompanied by the presentation of the appropriate UCS pattern. After training, the neural network system was tested on the disjoint set of digits in the testing set. The neural network system's performance variation was measured as a function of several network parameters: (1) number of connections between each output neuronal element and the input field, (2) patch creation criterion value ($T_c$), (3) patch merging threshold ($T_m$) and (4) patch retention threshold ($T_R$). Regression analysis was used to determine which of the parameters most affected each of the performance measures.

The percent correct plotted as a function of patch creation criterion value ($T_c$) and the patch retention threshold ($T_R$) showed performance is best for intermediate values of $T_c$ and $T_R$, but is relatively high for most of the range of values. Except for the case when both $T_c$ and $T_R$ are high simultaneously, percent correct remains within five percent of its maximum value.

The percent of patterns the network is able to classify (percent classified) is a function of $T_c$, the number of connections, and the patch merging threshold, $T_m$. Over most of the range of parameters, performance is relatively constant, although predictably, performance for 150 connections is a few percentage points higher than performance with 75 connections. Only for low values of both $T_c$ and $T_m$ does percent classified drop below ten percent of the maximum value, demonstrating that the network is robust to changes in global parameters.

The number of patches created by the network is a function of $T_c$, $T_R$ and $T_m$. As expected, the number of patches increases with increasing $T_c$ and $T_m$ and decreasing $T_R$. When a more stringent matching requirement between the patch and the CS input is applied (increased $T_c$), more patches are needed. Similarly, a low $T_R$ implies that even infrequently used patches are retained. There is a low correlation between the number of patches and the performance of the neural network system. As a first order approximation, as the number of patches increases, performance improves; deviations from this general rule are attributed to the decrease in ability to generalize as the number of patches increases.

The best performance on ZIP code digits of a neural network system that creates constant size patches is 96 percent correct. Covering the input space more efficiently using variable size patches results in a performance of 98 percent correct.

The second experiment used the small set of preprocessed digits and a method of constant size patch creation to demonstrate the ability of a neural network system to learn, store, and recall associations based on continuous-valued inputs (gray shades). As these experiments demonstrate, preprocessing significantly reduces the computational burden, but not the ultimate performance.

The digits in the training set are preprocessed [Hyman et al., 1991] using the self-organizing network of Rubner and Schulten [1990] that performs principal component analysis (PCA). The PCA network is trained using an equal number of digits of each class, all of which are taken from the training set. After training the PCA preprocessor, each test digit is then preprocessed, and the continuous-valued outputs of the first 20 (out of 352) PCA outputs are chosen to represent each digit as the input to the neural network system. This 94% reduction in the dimensionality of the input patterns is possible because most of the variation of the training set is represented by the first 20 components. Using more than the first 20 outputs does not improve the classification performance of the network.

The architecture and training of a neural network system that learns the preprocessed digits is almost identical to the neural network system that learns bit-mapped digits. The only difference is in the CS input field (one input for each of the 20 outputs from the preprocessor) and that each neuronal element is fully connected to all 20 inputs. Both neural network systems are identical as the UCS input field (a 1×10 array) and the output field (a 1×10 array of neuronal elements). For both neural network systems, the patch vectors are stored as 4 bit approximations to the real value to reduce storage requirements. The network is trained in exactly the same way as the network that learned the bit-mapped digits. Each pattern in the training set is presented only once and the order of presentation is random. Each presentation of the CS pattern is accompanied by the presentation of the appropriate UCS pattern as described for the earlier experiment. After training, a neural network system is tested on the preprocessed set of digits in the testing set. The output of the network to each input pattern is evaluated using exactly the same rules applied when the network was tested on the bit-mapped digits. As with bit-mapped digits, regression analysis is used to identify which of the parameters most affected each of the performance measures.

The variation in performance as a function of network parameters on the preprocessed inputs is very similar to the variation in performance on the bit-mapped digits. The percent of patterns the network is able to classify (percent classified) is a function of patch creation criterion value ($T_c$), and patch merging threshold ($T_m$). For both the bit-mapped digits and the preprocessed digits, performance generally increases as $T_c$ and $T_m$ increase. The percent of preprocessed digits that the network unambiguously, but not necessarily correctly, classified ("percent classified") is near 100% (compared to 95% for the case of bit-mapped images) and relatively constant for higher values of $T_c$ and $T_m$.

The percent correct for the preprocessed digits is a function of $T_c$ and $T_R$. Percent correct is relatively constant, within five percent of maximum for a large range of $T_R$ and $T_c$, but decreases when both $T_c$ and $T_R$ take on high values simultaneously. Thus for both bit-mapped and preprocessed digits, percent correct for constant size patch creation is 95%–96% for optimal parameter values. This demonstrates that preprocessing reduces the computational load by decreasing the number of inputs to the classifier, but does not alter the performance of the neural network system as a classifier.

The number of patches created by the network trained on preprocessed inputs is a function of $T_c$, $T_R$ and $T_M$. The number of patches created by the network increases with increasing $T_c$ and decreasing $T_R$. The effect of changes in $T_c$ and $T_R$ on the number of patches is the same whether the network is trained on preprocessed or bit-mapped digits.

The third set of experiments used the larger set of PCA preprocessed digits. Both variable size patch creation and constant size patch creation were evaluated in order to compare and contrast the performance of these two methods of patch creation. As in the previous experiments, only a single presentation of the training set is required to train a neural network system. The performance of the neural network system with respect to the method of patch creation is robust. Percent correct remains within 5 percent of the maximum value over most of the parameter space. An analysis of the number of patches created by the neural network system reveals that variable size patches more efficiently cover the pattern space. Performance on ZIP code digits is higher (97.8% vs. 96.5%) and fewer patches are created when the neural network system is trained using variable size patches.

EXAMPLE 4

Use of the Neural Network to Classify Hand Printed Japanese Characters

This example illustrates the use of the neural network system of the present invention to classify hand-printed Japanese Kanji characters.

The data consisted of hand-printed Japanese Kanji characters. A database of 160 exemplars (each written by a different person) of 956 Japanese Kanji characters (ETL8B2) was obtained through the courtesy of Drs. T. Mori and K. Yamamoto of the Electrotechnical Laboratory (ETL), Tsukuba, Japan. For the purpose of testing the neural network system, the first 40 exemplars of each character are designated the training set and the remaining 120 characters the test set. Thus different people wrote the training set and the test set. To reduce the dimensionality of the data the 63×64 binary pixel characters are preprocessed using a principal components (PCA) network [Rubner et al., 1990; Hyman et al, 1991] that is trained on each of the 40 exemplars of the 956 characters in the training set.

Results of the performance of the neural network system on preprocessed Kanji as a function of the number of characters and the number of PCA components used to describe each character decreases linearly with the number of different characters and increases with the number of PCA components.

An alternate test of the neural network system is to consider the training set as representing 40 different fonts of printed characters (or trained on the handwriting of the same people, possibly the staff in a particular office, whose handwriting is to be read at a future time) and use the training set as the testing set. For this task, the neural network system was tested on 40 to 320 different Kanji characters, with a data compression near 99%. Under these somewhat artificial conditions, that roughly correspond to reading 40 different fonts of printed text, the performance of the neural network system is constant, ranging between 100% and 99.7% correct identification, with a slowly increasing number of exemplars that the neural network system categorizes as "unknown" as the number of different characters to be recognized increases. In reading fonts, printing variations will introduce multiplicative noise. Because the neural network system is very robust to multiplicative noise, excellent performance on printed Kanji in multiple fonts is expected. It is noteworthy, and indicative of the power, stability, and robustness of the neural network, that close to optimum performance can be obtained on all of the problems described above (and on others) using exactly the same global parameters.

EXAMPLE 5

Configuring Dystal as An Extrapolator (e.g., Time Series Prediction)

The artificial neural network system disclosed herein (a specific architecture being designated "Dystal") was initially used to classify, complete, or restore patterns that do not change with time. In this example, time-variant learning is implemented.

As disclosed herein, basically, the artificial neural network (ANN) designated Dystal is taught two patterns to be associated, designated the CS and the UCS, by presenting the patterns in close temporal proximity, essentially simultaneously. The two patterns to be associated consist either (1) of two examples drawn from the same population, such as two different images of the face of the same person, or examples of a letter or a digit written by two different people, in order to teach Dystal pattern completion; or (2) a CS pattern such as described under (1) is presented to the system together with a classification vector as the UCS in order to teach Dystal the association between the image and its classification code.

For purposes of state vector prediction, Dystal is trained as disclosed in this example. No change in the neural network architecture is required; the only change is in the configuration of the pattern to be presented.

Figure 15:
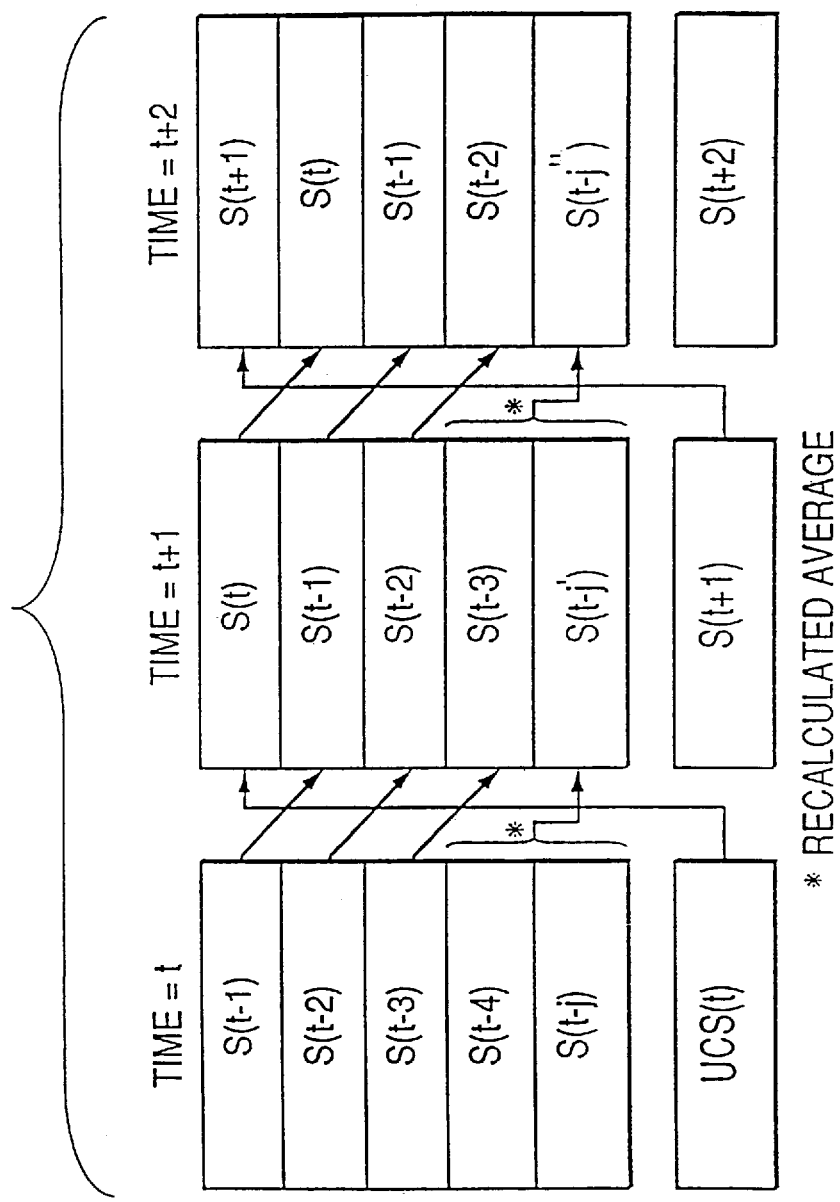
FIG. 15 is a diagram illustrating a CS matrix wherein the columns are values of S and the rows are specific time points at which S is known (UCS consists of S(t)).

Notational definitions are as follows: let $S(t)$ be the state vector of the system at time t, and let $t-1, t-2, \ldots$ represent sequentially prior times at which the state vector of the system has been determined. There is no requirement that the spacing of the time steps be uniform—only that they be internally consistent over time (e.g., $S(t)$ could be determined every hour between 8:00 a.m. and 4:00 p.m., every two hours between 4:00 p.m. and 1:00 a.m., and not at all between 1:00 and 4:00 a.m.). FIG. 15.

Training of the network consists of presenting to the network a CS consisting of the value of $S(t-1), S(t-2) \ldots S(i), S(j), S(k) \ldots$ where the values of S at i, j, k, ... can be either the values of S at specific previous time points or averages or weighted averages of values of S at specific previous time points or averages or weighted averages of values of S over prior time intervals. The specific choices made must be determined by an examination of the specific problem being addressed. Dystal requires only that the choices be made in a consistent manner. Thus the CS can be visualized as a matrix whose columns are the value of the components of S at a specific time point (or weighted average across a prespecified window of time points) and whose rows are the time points at which S is known. The UCS consists of $S(t)$. It follows that the size of the UCS should be no larger than a row vector of the CS matrix.

At the next time step each row of the CS is updated (either by moving it down one row—for the case of individual time points or by recalculating the averages). In this process, $S(t)$, the former UCS, now becomes $S(t-1)$ and is moved into the top row of the CS, the new $S(t)$ now being the UCS. (FIG. 15)

After a sufficient number of time steps (that expose Dystal to a broad gamut of possible states of the system) Dystal is sufficiently trained so that when presented with a CS of prior states, Dystal will output the value of S to be expected at the next regular time step, i.e., output the anticipated $S(t+1)$.

In many practical applications, it desirable to maintain Dystal in a training mode at all times. That way, Dystal "learns" temporally varying situations it may not have encountered in the original training sets, and, further, adjusts itself to changes in the system it is controlling that might influence the system's behavior (e.g., changes in composition of raw materials in a chemical reaction, the development of pot-holes in a street that will effect traffic flow, and the like). Dystal network is particularly well suited to the prediction (and control) of such situations.

EXAMPLE 6

A Traffic Flow Predictor

The following problem is soluble using methods of Example 5. Vehicular traffic control with the aim of maximizing traffic flow and minimizing delays requires the dynamic adjustment of traffic signal timing at each intersection, based on conditions not only at that intersection but also at surrounding intersections (a simple example of this truth is the efficacy of staggered timing of lights along boulevards in speeding traffic in one direction). A crucial element of such a control system is a predictive model. Given a predictive model, the techniques for designing a control system are well within the state of the art.

The solution using methods of Example 5 is as follows: Let the CS vector at any time, $t-1$, consist of the red and green cycle times (on times) of the light in each direction at the intersection to be controlled (for simplicity in this description delayed greens, turn lanes, etc., are ignored but can easily be accommodated by expanding the CS vector) together with the mean traffic velocity in each direction during each cycle and the number of cars. In addition, information on the traffic density and velocity at nearest neighbor and next nearest neighbor intersections (and further, as required) are included in the CS vector. As an illustration (details depend on the specific implementation and local environment) the CS vector at times $t-2$ through $t-10$ (rows 2 through 10 of the CS matrix) consist of the same information for the previous 10 light cycles. Row 11 contains the same items of information for the previous day taken as values averaged over, say, a one hour window (i.e., 24 hours earlier except on Mondays when it would be dated from the previous Friday). Rows 12–17 contain similarly averaged dates for the same day of the week in the 6 weeks prior to the current date. The first of these averages will serve to indicate the effect of immediate history (e.g., a new excavation in the neighborhood, a convention in town) while the last 6 yield prior history effects.

The UCS, at a minimum, consists of the current red/green cycle times and the traffic velocity and density information for the intersection to be controlled. Information from other intersections may be included if local experiments indicate the need for this information in the prediction process. Training, which is continuously ongoing, proceeds as indicated in the preceding sections. It is anticipated that the execution time of a training run will be much faster than the red/green light cycle.

All, or a part of, the output of a prediction run, the UCS vector expected at time $t+1$, is utilized by the controller to adjust the next cycle times. Before the controller has been turned on, the predicted red/green cycle times, is, of course, of no use, and only the traffic parameters is used by the controller. However, because of the continuous learning by Dystal, after the controller has properly adjusted the light cycles, and these optimal conditions have been obtained for a reasonable period of time, the predictive model has learned the appropriate red/green cycle times for the conditions, and little difference between controller and predictor output is expected. Under long-term steady-state conditions (for a given time of day) this is the anticipated and desirable operating point.

EXAMPLE 7

Improvements in the Ability of Neural Networks, Particularly Dystal. to Distinguish Among Small Differences in Similar InPuts Artificial neural networks (ANN), by their intrinsic nature, tend to classify by similarities rather than by differences. Consequently, when presented with tasks that require them to make fine distinctions among large numbers of classes (such as identifying individual people from portrait photographs or identifying to which of 3000 Japanese Kanji characters a particular hand-written exemplar is to be assigned) ANNs tend to become confused because the among-individual similarities overwhelm small among-individual differences as well as within individual differences. This becomes particularly important if the ANN is to be taught to ignore different facial expressions while recognizing individuals. An aspect of the present invention addresses both of these issues and describes a solution that is generally applicable to neural networks but is particularly simple to implement in the context of the Dystal network.

Face identification is presented as an example. The simplest embodiment of the invention requires two networks, each composed of two Dystal layers in series. The role of the first network is to discover similarities across the totality of the training exemplars, that is, features in common. As an example, the simplest way of doing this in the context of Dystal, is not to provide a UCS (equivalent to providing the same UCS to all exemplars), and to raise the "patch retention threshold" (PRT) in the first layer so that only patches used by a significant fraction of the input exemplars are retained.

An alternative method is to discard patches with an insufficiently high weight after the training is completed. In Dystal, the weight is a measure of frequency of utilization of a patch. The output of each layer is the patch number and similarity measure for each utilized patch. Thus, the output of the first layer is patch numbers for "features" that are common to large numbers of the training set, irrespective of their classification. No UCS is supplied, therefore, common features across classes use common patches, an important aspect of the present application of the invention.

Not all features are relevant to each image, or even to each class of image, even if the classes are similar, as in the case of faces. On the other hand, no one feature is characteristic of either an image or a class, except under the most unusual circumstances. A preferred way of subdividing the training set is by determining which of the 1st layer patches consistently are used together as a group. Defining such groups is the role of the second layer, whose input is the output of the first layer. Thus, the patches in the second layer are "patches of patches". This layer has no UCS. The second layer's patches are groups of patch numbers from the 1st layer that are active at the same time, thus grouping the inputs into sets (each of which may, indeed should, contain a multiplicity of individual classes).

To oversimplify, consider a training set consisting of, for example,different photos of each of a number of people, who tend to fall into three groups: dark-haired people with narrow chins, light-haired people with long hair, and bearded people. The first layer generates independent patches that might, for illustrative purposes, be designated a "dark hair", "beard", etc. The second layer's patches combine these independent "features" to produce "patches of patches", e.g., "light hair and beard". The groups of patches define such commonalities (similarities). The second layer may be used to triage the input into (e.g.) three such groups for further processing, if this is desirable for the application at hand. The number of different groups generated by the second layer is controlled by the number of patches allowed to form in the first layer (controlled by its global parameters), and the global parameters of the second layer, for example its "Patch Creation Criterion" (PCC), which controls the patch formation in the second layer. In the second layer a different similarity measure will, in general, be used than in the first layer. A difference measure such as described in Alkon et al (1990) is one example of an appropriate measure for the second layer.

Now consider a second of two layer networks (or subnetworks). After the first network is trained, and the patches on both the first and second layers are established, these patches are now transferred to the second network. Of course, the first two layer network could be reused, but the example is simpler for illustrative purposes with a separate second network. However, these patches will serve to prevent formation of patches similar to themselves, forcing (e.g., with a lower PRT and/or a higher PCC) creation of new patches that reflect the difference between the training pattern and these extant patches. These new patches are grouped by the second layer of the second network, and it is the second layer of the second network that will have an individual-specific UCS associated with them.

Several alternative embodiments for the implementation of this invention present themselves at each of the four layers. They can, in general, be considered independently, so that each implementation at a given layer can be combined with any of the other possibilities at the other layers.

1st Network, 1st Layer

The most critical aspect of the first layer is that of input representation, an issue outside the domain of this invention. However, the choice of input representation(s) is crucial to good performance by an ANN. In addition, the size and the composition of the receptive field play an important role by defining domains of comparison. For example, when a pixel representation is used, a relatively small receptive field emphasizes the smaller features (such as the shape of an eyebrow or a chin), whereas a larger receptive field gives more weight to the interrelationships of features, such as the relationship of the nose to the eyes. Last, but equally important, is that as in single layer Dystal, the PCC determines the number of first layer patches and their specificity, thereby determining the richness of choice of the patches that make up the components of the 2nd layer patches. An integral part of these considerations must be the number of patches from each output element that qualify for being included in the output of the first layer. While in some cases it may be desirable to define this as a percentage of the total number of patches created or as a specific count of patches, e.g., the top 4, a commonly desirable implementation is to set a threshold for the similarity measure and include in the output all patches whose similarity measure exceeds a globally set threshold.

As in the 2nd layer of the 2nd network, the similarity measure must be appropriate to a CS vector consisting of patch numbers and similarity measures. Pearson's r, used in the first layer, is suitable to similarity measures on gray scale images, not on patch numbers. Consequently, a different similarity measure (such as degree of mismatch with components weighted by the similarity measure of the first layer) is more appropriate. (see Description of the Preferred Embodiment).

1st Network, 2nd Layer

In this layer the balance between three parameters must be considered for optimal operation, namely the PRT, PCC, and the "patch merging threshold" (PMT). Among them, these three parameters will determine how many patches will be created and therefore into how many groups of classes the training set will be divided. The user defines neither the number nor the content of these groups of classes, but instead influences them indirectly through the choice of these parameters. Thus, the network can take advantage of groupings that may not have been evident a priori. It seems reasonable that this second layer should be fully connected to the first layer.

A second major influence on the choice of groupings is the issue of initial 1st layer input representation(s) alluded to above.

2nd Network, 1st Layer

The most important consideration in this layer is that it be identical in structure to the first layer of the first network (input representation receptive field structure, etc.) in order that the same training input produces the same patch match in the 1st and 2nd networks. However, in order to generate a fine grain spectrum of patches suitable to individual class identification, global thresholds such as the PRT and/or the PMT may be decreased.

2nd Network, 2nd Layer

Two quite distinct possibilities obtain here.

In one case, the first network is used to triage the inputs into groups each of which is fed into a separate second network. In this case the role of the patches created by the second layer of the first network is to remove patches that contain similar information across classes from consideration, that is, to identify individuals by creating patches that contain difference information within classes. Thus, multiple second networks are required, one for each triage group as determined by the first network. Each 2nd network identifies individuals within a single group although provision may, of course, be made, that some individuals with ambiguous characteristics may fall into two groups and be processed by both networks, with agreement between the two outputs required before a correct identification call is made.

In the second case the first network is not used to triage the inputs; rather, two (smaller) second layers are constructed for the second network, each fully connected to the first layer of the second network. One of these second layers contains the second layer patches from the first network and has the role of signaling to which group of input classes the current unknown input corresponds. The other second layer contains only those patches relevant to separating individuals. In the latter case, the output of the second layers could be characterized as being of the form: (from the first of the second layers) "it is individual C." An alternative embodiment builds the second portion of the second layer onto the first layer of the first network (no second network is needed) after the two layers of the first network have been trained.

EXAMPLE 8

Multilayer Dystal

This example describes a number of improvements to an artificial neural network e.g. Dystal (Dynamically STable Associative Learning) system that allow the creation of multiple layer Dystal networks, which have a number of advantages over single layer Dystal networks. Also disclosed is a method of decreasing storage requirements and reducing translational and distortional sensitivity in a multilayer Dystal network.

In the following discussion, the "input layer" is the first layer (which receives the inputs to the network) and a "non-input layer" is any other layer. Similarly, the "output layer" is the final layer (the layer that produces the ultimate output of the network as a whole) and a "non-output layer" is any other layer. When discussing individual neurons, the terms input and output are used differently: The neuron being considered is referred to as the "output neuron". An "input neuron" is a neuron whose output is one of the inputs to the neuron being considered. Thus, a neuron in layer N is an output neuron when neurons of layer N are under consideration, but is an input neuron in relation to neuron in layer N+1.

This disclosure describes how to implement multiple layer Dystal. There are four aspects of the implementation to be considered: (1) what signals are propagated from neurons of non-output layers, (2) what values are stored in a patch of non-input layers in response to those signals, (3) what similarity measure is used to compare the propagated signals with the stored patches, and (4) how does training construct and modify the patches.

a. Non-Input Layer Patches

In one layer Dystal, a patch vector is directly derived from the CS input values. In multi-layer Dystal, non-input layers have receptive fields defined on neurons of the previous layer, i.e., "higher" layers receive inputs from neurons of the "lower" layer. Because Dystal requires no feedback for training, the "higher/lower" hierarchy is arbitrary and can refer to any arrangement of neurons that have an input/output relationship. Thus, a patch of a non-input layer does not store input CS values, and for non-input layers the content of a patch vector must be redefined.

It is part of the invention that patches of the non-input layers, as a minimum, store patch labels. A patch label is an arbitrary label uniquely identifying each patch of a neuron. One or more patch labels from each input neuron are stored in a patch of an output neuron. In an illustrative embodiment the label of a single patch from each neuron is stored. However, this scheme is easily extendible to more than one patch from each neuron. The most common ways of choosing more than one patch are to use the n patches with the highest similarity values or all patches with a similarity value greater than some threshold. This extension is often desirable and is an integral component of the invention. An extended version of these patches also stores the corresponding similarity values with the patch labels. That is, a patch consists of one or more (similarity, patch label) pairs per input neuron. This requires additional computer memory, but with some of the similarity measures described below, can lead to greater sensitivity for the network.

These patches on non-input layers are referred to herein as "meta-patches" when it is important to distinguish them from input layer patches. When a statement about "patches" is unqualified (as either a meta-patch or an input layer patch), the statement applies to both meta-patches and input layer patches.

b. Non-Output Layer Propagation

In contrast to single layer Dystal, where every neuron outputs (propagates to the output) a UCS value, in multilayer Dystal, neurons in the non-output layers do not receive UCS inputs and therefore cannot propagate a UCS value. An aspect of the invention is the explicit definition of three different embodiments of what values to propagate from neurons of non-output layers of Dystal. In each of the embodiments, a neuron in a non-output layer calculates the similarities (Pearson's r for the input layer or one of the similarity measures defined below for the other layers) between each of its patches and its input pattern (whether it is the CS pattern for the input layer or the pattern of values propagated from the layer below for other layers).

In the first (and simplest) embodiment, a neuron determines which of its patches has the greatest similarity to the incoming pattern and then propagates the label of that patch. This can be extended to propagating the patch number for the greatest similarities, or all with similarity greater than some threshold. This embodiment requires the least amount of computer memory. The information to be utilized by the higher level neuron is determined entirely by the lower level neuron. Also, it is impossible for a network that uses this option to have extended meta-patches that include the similarity values because the similarity values are not propagated.

In the second embodiment, which is a generalization of the first, the similarity of the incoming pattern with the most similar patch (computed by the lower level neuron) is propagated together with the patch label.

Thus, the neuron propagates a single (similarity, patch label) pair to neurons of the next higher layer. Again, the information to be used by the higher layer neuron is predetermined by the lower level neuron.

In the third embodiment, the lower level neuron propagates the (similarity, patch label) pairs for each of its patches. Alternatively, to reduce computation, the n patches with the greatest similarity or all patches with a similarity above a preset threshold may be propagated. In this case, the upper level neuron determines what information from the lower layer it chooses to utilize.

A neuron of the final (output) layer then associates some function of its input with a UCS value and propagates the UCS value, as in single layer and learning strategy as discussed below.

c. Non-Input Layer Similarity Measures

Single-layer Dystal uses a similarity measure such as Pearson's r to calculate the similarity between the input CS pattern and the stored patches. Pearson's r and other Euclidean metrics are not computable for labels (such as those stored in the meta-patches described herein) because a Euclidean metric such as a dot product or Pearson's r assumes that the values are ordinal; labels are cardinal numbers, not ordinal so this assumption is invalid. An alternative similarity measure is required. The definition of such alternatives forms an important component of the invention. Different similarity measures for neurons of the non-input layer(s) are disclosed herein which are suitable for each of the three propagation alternatives discussed above.

The first option is to propagate only the patch labels of the most similar patches. In this option, computing the similarity value between a meta-patch and its input requires the comparison of two ordered sets of patch labels: the current set of patch labels being propagated, and the patch labels stored in the meta-patch. The ordering is on the neuron number in the lower layer; the patch labels themselves are not ordinal. A possible measure is the degree of match; another is the degree of mismatch—both described in U.S. Pat. No. 5,119,469. (see also Description of the Preferred Embodiment in the present document). This is a count of the matching or of the mismatching patch labels within the two sets.

An elaboration of these measures is possible with the second option. In the second option, the similarity measure (which is ordinal) is propagated along with the label of the most similar patch. This value can be used to calculate a weighted degree of match. Then, rather than simply summing the number of matching (or mismatching) patch labels, a weighted sum of the matches and mismatches is calculated. Matches have a value of +1 times the similarity and mismatches have the value of −1 times the similarity. This provides a degree of confidence in each match, so that the overall similarity value is less affected by those matches which are uncertain. It is not appropriate to apply a metric to the similarity values in this case because the similarity values only have meaning relative to the patch label with which they correspond. Even. if, the corresponding similarity values are stored in the meta-patches, when a stored patch label does not match the propagated label, there is no meaningful relationship between the stored and propagated similarity values.

Figure 16:
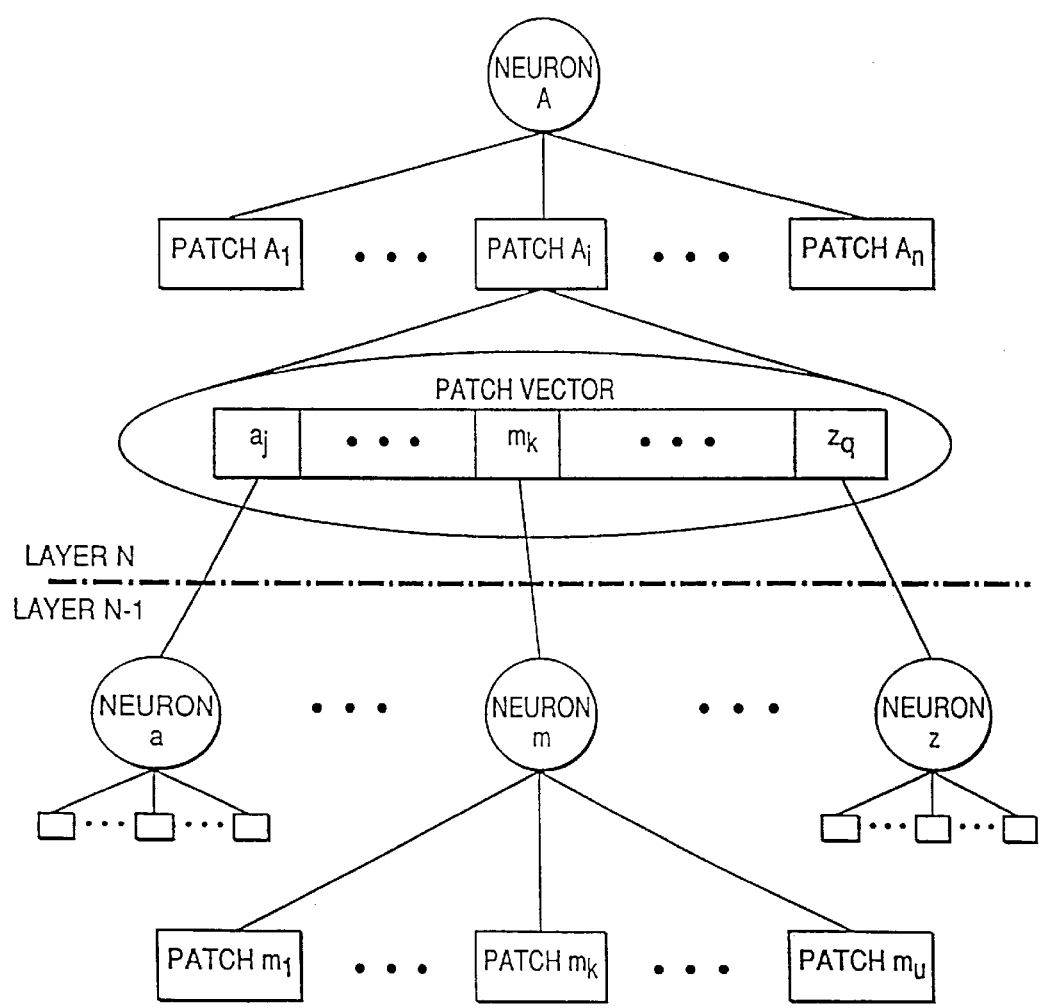
FIG. 16 a diagram of the inputs to a neuron (neuron A) of a non-input layer (layer N, N≠1). The patch vector for one of its meta-patches (patch $A_i$) is shown. The patch vector has one entry from each layer N−1 neuron within the RF of neuron A (neurons a through z). Each entry is a patch label for the corresponding neuron (i.e., the entry shown contains the label of $m_k$, one of the patches of neuron m from layer N−1.

In the third option, all or some subset of the (similarity, patch label) pairs, as described in previous paragraphs are propagated. This option differs from the first two in that the meta-patches of the output neuron get to "choose" which of their input values to use. Whereas in the first two options, the input neuron chooses which patch label to propagate (accompanied by its similarity value in the second option), in the third option, the input neuron propagates all patch labels together with their similarity values. The meta-patches of the output neuron then decides which of these values to use. This means that each meta-patch of the same neuron may be looking at a different subset of the propagated values. Specifically, the decision is based on each meta-patch looking at only those similarity values that derive form the patches whose labels were previously stored in the patch vector of the meta-patch. Because, in the simplest case, there is one patch label stored per input neuron, the meta-patch looks at one similarity value per input neuron. For example, in FIG. 16, the input from the neuron m when calculating the similarity of patch $A_i$ is the similarity value computed for patch $m_k$.

Figure 17:
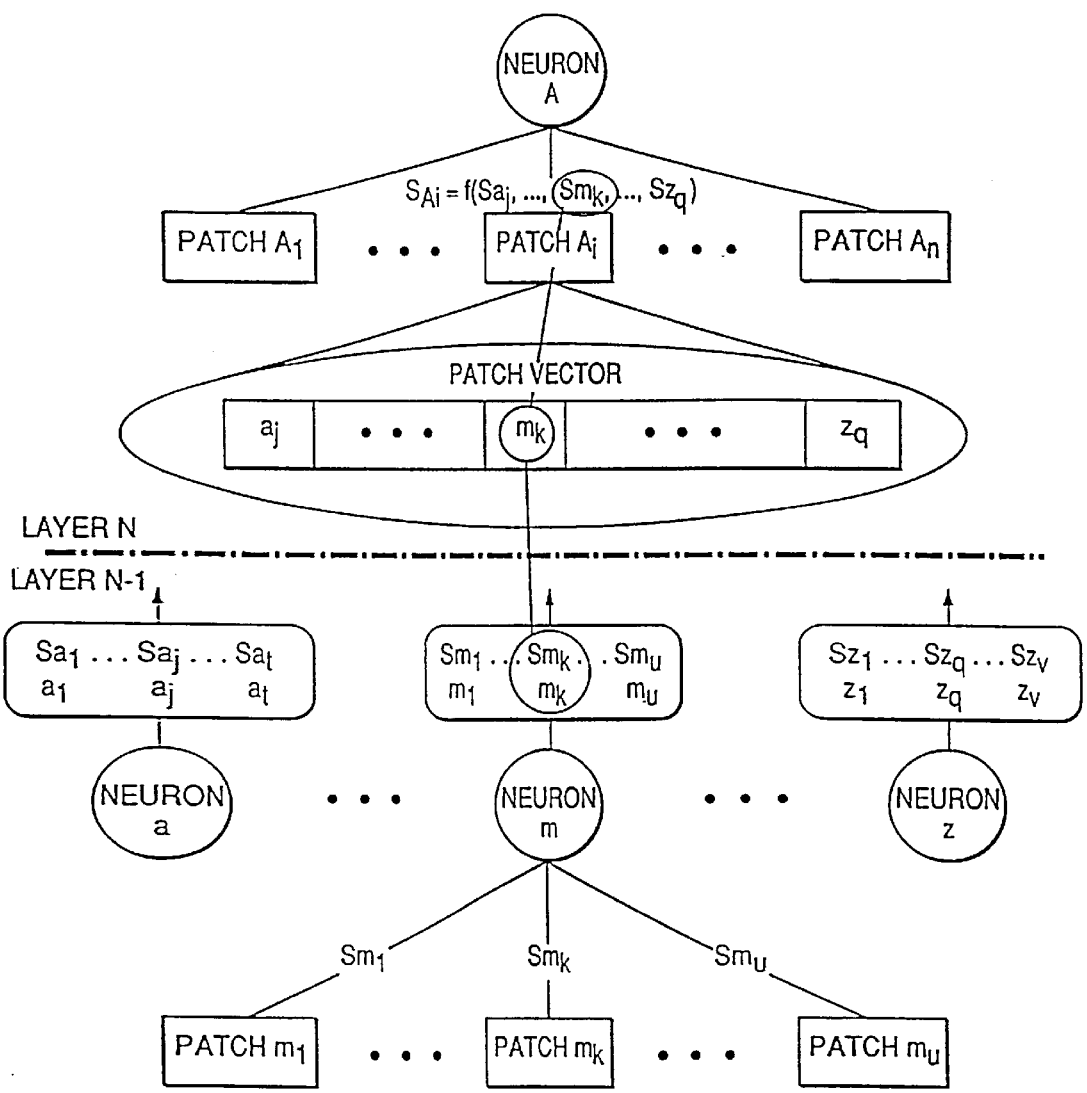
FIG. 17 illustrates the calculation of the similarity of a patch in a non-output layer. $Sm_k$ is the similarity calculated by neuron m of layer N−1 for patch $m_k$. Neuron m propagates the similarities calculated for all of its patches (propagated values are shown in the rounded rectangles). A similarity value for a patch of the next layer (patch $A_i$) is calculated using the similarity values propagated from below corresponding to the patch labels stored in its patch vector.
Figure 18:
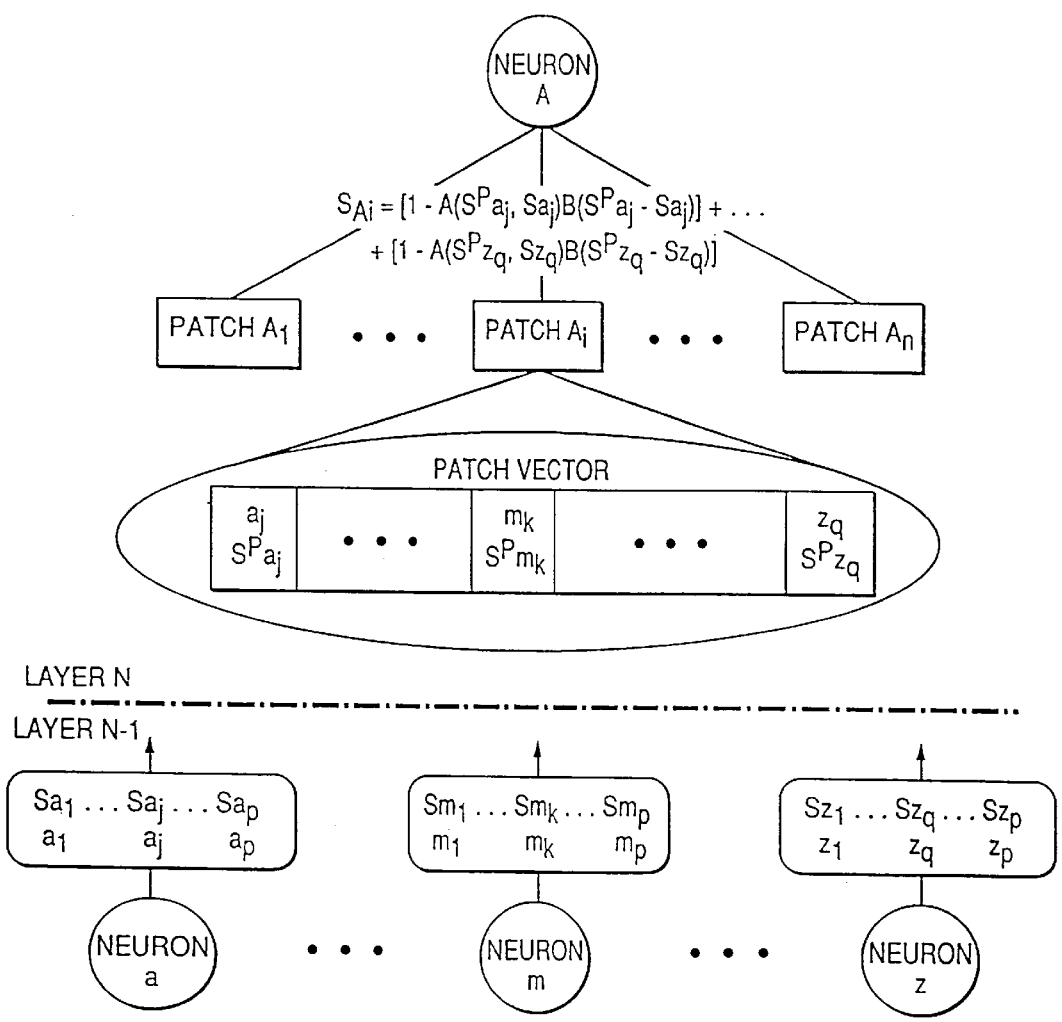
FIG. 18 illustrates the calculation of the similarity of a patch in a non-output layer using extended meta-patches. $Sm_k$ is the similarity calculated by neuron m of layer N−1 for patch $M_k$. $S^P m_k$ is the similarity stored in the patch vector of a neuron of layer N for patch $m_k$ of layer N−1. The superscript "$^P$" indicates that the similarity value is stored in a patch. This may be an average of similarity values.

An alternative implementation of the third option, that allows for greater variability in the input patterns, is to store in the patch vector more than one (the top n or all greater than some threshold) (similarity, patch label) pair as the contribution of each input neuron to the meta-patch. (See FIG. 17). The similarity stored in the patch vector is the running average of the similarities that have matched the patch, calculated as in single layer Dystal. Then the similarity is calculated on the combined set of similarities over all input neurons. This is an array of ordinals, consequently the definition of a Euclidean or other metric is appropriate.

The input similarity values for a meta-patch are combined using an appropriate function. For some applications, it will be desirable to ignore the input similarity values which are too low. In that case, the input similarity values that are the greatest ("greatest" is defined herein either as "top n" or by exceeding a threshold) are combined. Using less than all of the input values for a meta-patch will decrease sensitivity to pattern obstruction, local distortions, and related phenomena.

The function used to combine the similarity values is arbitrary within wide limits. It could be as simple as the average. In that case, the similarity between a meta-patch of a neuron of a non-input layer and its input pattern of (similarity, patch label) pairs is the average value over all qualified similarity values that are paired with one of the patch labels stored in the meta-patch's patch vector. Clearly, this function could be replaced with other functions as needed for any given application.

An extension of this scheme is also possible with the third option of propagation. This extension uses the extended meta-patches that store the similarity values. In this case, rather than using a function which rewards high similarity values, it is possible to use a function which rewards similarity values that are close to the stored similarity values. To this end, any Euclidean metric is suitable. The following similarity function is $$\text{similarity} = \frac{\sum_{j=1}^{J} [1 - A(x_j, y_j) B(x_j - y_j)]}{J}$$

where $x_j$ is the similarity value previously stored in the $j^{th}$ entry of the meta-patch path vector, $y_j$ is the similarity value propagated with the patch label stored in the $j^{th}$ entry of the meta-patch patch vector, $B(x_j - y_j)$ are similarity values and $A(x_j, y_j)$ is a function that modulates the contribution that a given degree of similarity mismatch will make.

Note that $y_j$ is the similarity value generated by the patch indicated by the $j^{th}$ patch label in response to the input pattern. In the simplest (and most common) case, $A(x_j, y_j)$ will be a constant.

An example of a function for $B(z)$ is $z^{2n}$, for some value of n. This provides a symmetric decline in the calculated similarity value as the similarity difference increases.

It may be desirable in some embodiments to define a similarity function which is asymmetric by suitably defining A and/or B. Another desirable variant is to define one function for comparisons of similarity values propagated by the patches from each input neuron (within a neuron) and then combine the resulting values using a different function (across neurons).

Examples of functions for A include one that decreases the contribution to the similarity of those components whose similarity is small, or one that gives particular weight to those whose similarity is especially high. Functions chosen on biologically realistic grounds, such as functions that reflect the consequences of changes in calcium concentration that modulate membrane conductance consequent to learning, or that model a membrane potential modulated impedance matching between synaptic spines and dendritic branches, are particularly preferred candidates.

d. Learning in Multiple Layer Dystal

Multi-layer Dystal also requires an extension to Dystal's learning algorithm. Each layer of a multi-layer Dystal network is trained fully before training of the next layer begins, starting with the input layer. The input layer is trained as single layer Dystal, except for the lack of an input UCS value to the neurons of non-output layers.

A new patch is created if the patch vector of the selected patch (the patch with the greatest similarity) is not sufficiently similar to the input pattern. There is no comparison between the stored UCS value and the input UCS value because there is no input UCS value. This is the same as training single layer Dystal with a constant UCS. If all patches have the same constant UCS value, then the stored UCS value always matches the inputUCS value and only the CS determines whether a patch is matched or a new one is created. This is equivalent to a fixed radius patch creation in single layer Dystal. In multi-layer Dystal, the size of the UCS vector does not determine the number of neurons in any but the output layer. The size of non-output layers are determined by the number of receptive fields defined on the CS pattern for the input layer or defined on the previous layer for non-input layers.

Another implementation, based on an intentional feedback mechanism from higher levels, has the advantage of allowing variable radius patch creation within the context of multi-layer Dystal. In single layer Dystal, the number of neurons is determined by the number of components in the UCS vector and each neuron receives a component of the UCS vector as a UCS input value. In multi-layer Dystal, this correspondence applies only to the output layer. The number of neurons in the input and intermediate layers is determined by the receptive field definitions on those layers. Neurons of the output layer (as in single layer Dystal) may use the UCS values to allow variable radius patch creation. Without a UCS value or surrogate, variable radius patch creation is impossible. Variable radius patch creation is, however, highly desirable because for any given problem, the number of patches created using variable radius patch creation is smaller, often considerably smaller, than using fixed radius patch creation. Also, a network that uses variable patch creation is generally much easier to tune for any given problem.

To allow variable radius patch creation in the non-output layers of a multi-layer Dystal network, a scalar "class number" is suitable as a surrogate for intentional feedback. This works as follows: each significantly different UCS vector represents a different "class" of inputs. In an arbitrary manner, a unique scalar class number is assigned to each of these classes. This class number is used as a surrogate UCS to every neuron of each of the non-output layers. These values can be implemented as disclosed herein, using this surrogate UCS input instead of the UCS component. The output layer receives the true UCS and does not require the class number for patch formation.

To train higher, non-input layers, a pattern is presented and each neuron of the first layer, which has been previously fully trained, computes similarities between its patches and the pattern within its receptive field. Each neuron then propagates the appropriate patch, label(s) with or without similarity values (as described herein) to the next layer. Each neuron of the succeeding layer uses its input values as described above to compute the similarity to each of its meta-patches and propagates the appropriate values. This process is repeated for each layer up to the one being trained.

Neurons of the layer being trained compute the similarities for each of their meta-patches in the same way as lower layers. They then determine whether or not to create a new patch. This decision is made just as in single-layer Dystal. If the similarity value is high enough and the UCS value matches (in the output layer only, or the surrogate UCS value, if it is being used, in the other layers), the patch is considered matched. Otherwise, a new patch is created. When a new meta-patch is created, it includes either a. list of patch labels or a list of (similarity, patch label) pairs.

If the neurons of the network are propagating a single patch label or (similarity, patch label) pair (embodiments one and two), the patch vector of the meta-patch is merely the list of patch labels that are propagated by each of the patch's input neurons.

If the network is propagating all (similarity, patch label) pairs (embodiment three), the neuron in the layer being trained determines the maximum similarity value being propagated by each input neuron and stores the corresponding patch labels in the patch vector (one patch label for each input neuron). An extension of this method is to store more than one patch per neuron. This can be accomplished either by storing the label of all patches with a sufficiently high similarity value greater than some predetermined threshold or by storing the labels of the n patches with the highest similarity values. The meta-patches may also store the corresponding similarity values (the extended third embodiment). If the similarity values are stored, they are updated to be the running average of the corresponding similarity values when the meta-patch is matched.

After training each layer, a consolidation phase may be desirable if surrogate UCS values are being used. The consolidation phase consists of comparing the patches of a layer and combining (as in single layer patch merging) those patches that are sufficiently similar to one another. Consider two classes, 1 and 2, both of which have patches A, B, and C as their most similar patches. By virtue of the class numbers, two meta-patches are created during training, both with patches A, B. C, in their patch vectors. After training is complete, two possible results are "indistinguishable" as defined by a threshold, in which case the two patches are combined into one patch; or they are distinguishable (e.g., one has a pattern of similarity values 0.9, 0.7, 0.5 and the other 0.5, 0.7, 0.9), and they should be maintained as separate patches.

e. Patch sharing

An improved alternative implementation of multi-layer Dystal involves the sharing of patches by neurons of each non-output layer. Sharing patches reduces the total number of patches created by the entire network and therefore reduces the storage and memory requirements. With patch sharing, the features learned by layers of the network become global features. By studying the patches created using Dystal with patch sharing, a person may be able to appreciate the feature set needed for representation/classification for a given problem. These patches could, for example, be transferred to another application as feature detectors. Patch sharing allows the possibility, as discussed below, for creating networks that are translationally insensitive and more robust to pattern distortions.

In a version of Dystal, each neuron maintains its own set of patches. The patch sharing modification involves the use of one list of patches accessible by all neurons of a given layer. Thus, there is one set of patches for each layer that uses patch sharing. Because these patches are matched (and, in some of the implementations described, updated) by neurons independently of their location relative to the input pattern, they now represent global, rather than local, features.

To further explicate this modification, consider the following example. When a new pattern is presented in the receptive field of a neuron, that neuron creates a patch to represent that pattern. Without patch sharing, a similar pattern presented in the receptive field of a second neuron will cause the second neuron to also create a new patch with the same contents. With patch sharing, the first neuron creates the patch on the shared set of patches. The second neuron then compares its input pattern (within its RF) with each patch in the shared set (including the patch created by the first neuron) before deciding whether to create a new patch. If the patterns are indeed similar, the second neuron will use that patch, thereby saving storage space since there would be no need to create a new, identical, patch on a different neuron. Because the relationship of patch to neuron is maintained, specificity of feature to RF location is preserved.

f. Multiple Layer Learning Vector Quantization (LVQ)

The techniques disclosed herein are also applicable to creating multiple layer versions of Vector Quantization (VQ) [Gersho, 1992], including Learning Vector Quantization (LVQ) [Kohonen, 1988; Ahalt, et al., 1990], which are commercially important data compression algorithms. A single non-output layer of Dystal with shared patches is similar to VQ in some aspects. To apply VQ to a set of patterns, each input pattern is partitioned into blocks called "data vectors," which are conceptually equivalent to Dystal's receptive fields. In VQ and LVQ, an iterative technique is applied to determine a set of "code words," which are conceptually equivalent to Dystal's patches. The set of code words is called a VQ "code book." This is similar to Dystal's shared set of patches.

To apply VQ as a data compression technique, each data vector of a pattern is represented by the label of the code word that best matches the data vector. This is analogous to Dystal propagating the patch label corresponding to the most similar patch.

Creating multiple layers of VQ has a similar problem to creating multiple layer Dystal; higher layer VQ layers cannot use a Euclidean metric to compare input data vectors (consisting of code word labels) with code words (consisting of code word labels). Therefore, the invention disclosed herein may also be used to find the most similar code word in a multiple layer version of VQ. If VQ is being used as a classifier, any of the similarity measures disclosed herein are applicable to multi-layer VQ. If VQ is being used as a data compression technique, the similarity measures which use patch numbers only, are applicable.

g. Insensitivity to Translation and Distortion by Use of Shared Patches

Translational invariance is the ability to respond to a pattern independently of the location of the pattern in the input field. Translational insensitivity is defined as a response that is independent of small shifts in location, where the definition of "small" varies, depending on the degree of insensitivity. The sharing of patches allows for translational insensitivity of the network. If the input layer is divided into Receptive fields, then translation insensitivity in each RF is equivalent to allowing distortion of the pattern, defined as the translation of small pieces of a pattern in different directions than other pieces. Thus, patch sharing allows for the creation of networks that are insensitive to input pattern distortion.

One of many possible implementations which have translational and distortional insensitivity by virtue of patch sharing is as follows:

The implementation involves "jiggling" the inputs to a neuron and determining a pattern's similarity to an existing patch without regard as to whether it is centered on the receptive field or is shifted. That is, a patch is compared not only with the pattern centered in the neuron's RF, but also with that pattern when it is shifted various amounts in various directions. Shifting can be performed in small increments up to the radius of the receptive field in all directions. The best matching patch at any position within the RF is then selected. Thus a pattern presented in one location (for example, the center of the RF) will match the same patch when it is presented elsewhere (say, the lower right corner of the RF). When combined with patch sharing, this works across the pattern because the pattern within one neuron's RF will be compared with the same patches as that pattern within another neuron's RF.

In non-input layers, jiggling allows the grouping of features (as represented by patches) independently of the exact location of the features. Consider a feature whose top half is most similar to patch A and whose bottom half is most similar to patch B. A second layer neuron may learn that when this feature is present, patch A is propagated from one neuron in its RF and patch B is propagated from the neuron below the first neuron. When propagating (similarity, patch label) pairs, a patch is said to be propagated when the paired similarity value is high. If the feature appears elsewhere in the image, patches A and B are propagated from two different neurons that are in the same spatial arrangement as the first two neurons. Jiggling allows the second layer neuron to recognize the combination of patches A and B regardless of which neurons propagate them (as long as the neurons are in the proper spatial arrangement). Each layer can only provide an amount of translational insensitivity comparable to the size of its RF. However, multiple layers of this type can provide large amounts of translational insensitivity, as well as insensitivity to distortion. This is conceptually similar (but operationally different) to the manner in which the Neocognitron [Fukushima, 1980 and 1988] obtains its insensitivity to translation and distortion.

h. Summary

Techniques for creating multiple layer versions of Dystal as described offer the following advantages:

(1) Patches become feature detectors. Thus, Dystal learns to classify patterns in a matter more similar to humans, who have the best classification system known.

(2) These techniques are also applicable to the creation of multi-layer versions of LVQ.

(3) With patch sharing, multi-layer Dystal has the following additional advantages:

(a) Patches become global feature detectors. This makes Dystal perform in a manner even more similar to that used by humans.

(b) Implementing a network that is robust against translation and distortion becomes trivial.

(c) Storage requirements (memory and disk) are reduced.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

REFERENCES

The references listed below are incorporated herein by reference to the extent that they supplement, explain, provide a background for, or teach methodology, techniques, and/or compositions employed herein.

Ahalt, S. C., Ashok, K. K., Chen, P., Melton, D. E. (1990) Competitive learning algorithms for vector quantization, Neural networks 3(3): 277–290.

Alkon, D. L., Vogl, T. P., Blackwell, K. T. (1991) artificial Learning Networks Derived from Biological Neural Systems. In Neural Networks: Concepts, Applications, and Implementations Part III. Ed. Antognetti P., Milutinovic V. Prentice-Hall. Pp. 24–46.

Alkon D. L., Vogl, T. P., Blackwell, K. T., Tam, D., (1991) Pattern Recognition and Storage by an Artificial Network Derived from Biological Systems. In Neural Network Models of Conditioning and Action. Vol. 11 of Quantitative Analysis of Behavior, M. L. Commons, S. Grossberg, and J. E. R. Staddon, Eds. Chapter 1.

Alkon, D. L., Blackwell, K. T., Barbour, G., Rigler, A. K., Vogl, T. P., (1990) Pattern Recognition by an Artificial Network Derived from Biological Neural Systems. Biol Cyber 62: 363–376.

Alkon D. L., Blackwell K. T., Vogl T. P., Werness S. A. (1993) Biological plausibility of artificial neural networks: learning by non-hebbian synapses. Associative Neural Memories, M. H. Hassoun, Ed., Oxford University Press, in Press.

Alkon, D. L., Vogl, T. P., Blackwell, K. T. Dynamically Stable Associative Learning Neural System. U.S. patent application. 07/524,319, CIP of 07/448,090 and 07/353,107 (Adn'd). ALLOWED: 8 Jan. 1992. {Basic patent on Dystal}

Alkon, D. L., Blackwell, K. T., Barbour, G., Rigler, A. K., Vogl, T. P. Pattern Recognition by an Artificial Network Derived from Biological Neural Systems. Biological Cybernetics, 62: 363–376 (1990).

Barbour, G. S., Alkon, D. L., Vogl, T. P., Blackwell, K. T. Enhancements to Dystal. Patent Disclosure submitted, 21 Aug. 1991. {Covers variable sizes patches, pruning, and budding}

Barbour G. S., Blackwell K. T., Busse T., Alkon D. L., Vogl T. P. (1992) Dystal: a self organizing ANN with pattern-independent training time. Proc of the IJCNN '92 IV: 814–819.

Blackwell, K. T., Vogl, T. P., Hyman, D. S., Barbour, G. S., Alkon, D. L. A New Approach to Hand-Written Character Recognition. In Press, Pattern Recognition, 1992.

Blackwell, K. T. Alkon D. L., Hyman S. D., Barbour G. S., Vogl T. P., (1992) A new approach to hand-written character recognitions. Pat Recog, 25: 655–666.

Fukushima, K. (1980) Neocognitron: A self-organizing neural network model for a mechanism of pattern recognition unaffected by shift inposition. Biol Cyber 36: 193–202.

Fukushima, K. (1988) Neocognitron: A hierarchical neural network capable of visual pattern recognition, Neural Networks 192): 119–130.

Gersho, A. Gray, R. M. (1992) Vector Quantization and Signal Compression, Kluwer Academic Publishers. PP 611–618.

Hyman S. D., Vogl T. P. Blackwell K. T., Barbour G. S., Irvine J., Alkon D. L. (1991) Classification of Japanese Kanji using principal component analysis as a preprocessor to an artificial neural network. Proc of the IJCNN '91 I: 233–238.

Hyman, S. D., T. P. Vogl, K. T. Blackwell, G. S. Barbour, J. Irvine, D. L. Alkon (1991), Classification of Japanese Kanji using principal component analysis as a preprocessor to an artificial neural network, *Proceedings of the IJCNN '91, In Press*.

Hyman, S. D., Vogl, T. P., Blackwell; K. T., Barbour, G. S., Irvine, J. M., Alkon, D. L. "Classification of Japanese Kanji Using Principal Component Analysis as a Preprocessor to an Artificial Neural Network". Proceedings IJCNN '91 I:233–238 (1991)

Kohonen, T. (1988) An introduction to neural computing, Neural Networks 1(1): 3–16.

Miller, W. T. (ed.) (1992) Neural Networks for Control, MIT Press, Cambridge, Mass.

Rubner, J., K. Schulten (1990), Development of feature detectors by self-organization. A network model, *Biological Cybernetics* 62, 193.

Vogl T. P., Blackwell K. T., Irvine J. M., Barbour G. S., Hyman S. D., Alkon, D. L. (1993) Dystal: A neural network architecture based on biological associative learning. Progress in Neural Networks, Vol III. Eds. C. L. Wilson, O. M. Omidvar, Ablex Publishing Co., Norwood, N.J., In Press.

Vogl, T. P., Blackwell K. L., Hyman S. D., Barbour G. S., Alkon D. L. (1991) Classification of Hand-Written Digits and Japanese Kanji. Poc of the IJCNN '91 I: 97–102

Vogl, T. P., Alkon, D. L., Blackwell, K. T. (1989) Dynamically Stable Associative Learning (DYSTAL): A Biologically Motivated Artificial Neural Network. Proc of the IJCNN '89 II: 101–103.

Vogl, T. P., Alkon, D. L., Blackwell, K. T., Barbour, G. S. Multilayer Dystal. Patent Disclosure submitted 21 Aug. 1991. {Covers multilayer Dystal—patches of patches—propagation of patch number, similarity measure, and possibly measure of frequency of utilization}

Vogl, T. P., Blackwell, K. T., Irvine, J. M., Barbour, G. S., Hyman, S. D., Alkon, D. L. "Dystal: A neural Network Architecture Based on Biological Associative Memory". In *Progress in Neural Networks, III*, C. L. Wilson and O. M. Omidvar, Eds., Ablex Publishing Co., Norwood, N.J. 1992.

Vogl, T. P., Blackwell, K. L., Hyman, S. D., Barbour, G. S., Alkon, D. L. "Classification of Handwritten Digits and Japanese Kanji". Proceedings IJCNN '91 I:97–102 (1991).

Vogl T. P., Blackwell K. T., Barbour G. S., Alkon D. L. (1992) Dynamically Stable Associative Learning (Dystal): A Neurobiologically based ANN and its applications. Science of Artificial Networks, D. W. Ruck, Ed. Proc. SPIE 1710, Pp. 165–176.

We claim:

1. A neural network architectural unit comprising:
   (a) a first input for receiving a set of conditioned stimuli;
   (b) a second input for receiving an unconditioned stimulus;
   (c) a patch element coupled to the first and second inputs and for receiving and processing the set of conditioned stimuli and the unconditioned stimulus, the patch element producing an output; and
   (d) an output neuronal element for accepting the output of the patch element and for providing an output for the neural network architectural unit.

2. The neural network of claim 1, wherein the output neuronal element has a receptive field which comprises a subset of the conditioned stimuli and a component of the unconditioned stimulus.

3. The neural network of claim 2, wherein the patch element is associated with the receptive field which retains at least one connection to the patch element but from which at least one connection to the patch has been removed, provided that the signal on each of the removed connections, at the time of its removal, varied significantly when the patch element was active relative to the input's variance overall.

4. The neural network of claim 1, further comprising a plurality of patch elements, each of which receives a plurality of inputs and is connected to the output neuronal element.

5. The neural network of claim 4, wherein each patch element spans a volume of hyperspace determined by a plurality of thresholds used as criteria in deciding either to create a new patch element or to modify a previously existing patch element when a conditioned stimulus is input to the network, wherein a first threshold sets the maximum size for a patch element, and a second threshold sets a minimum size for a patch element.

6. The neural network of claim 5, wherein the thresholds are further defined as functions of the similarity computed between a value of the conditioned stimulus and a value of a previously existing patch element.

7. The neural network of claim 1, wherein the set of conditioned stimuli arises from a pattern to be classified, and the unconditioned stimulus is a classification category.

8. The neural network of claim 1, wherein the conditioned stimuli are generated by optical scanning of a photograph.

9. The neural network of claim 1, wherein the conditioned stimuli are signals representing values at previous specific points in time, and the unconditioned stimuli are signals representing values at a present time.

10. The neural network of claim 1, further comprising:
    (a) a patch vector which is the average value of the conditioned stimuli with which the patch element has matched;
    (b) the expected value of one component of the unconditioned stimulus that is associated with the conditioned stimuli; and
    (c) a weight based on frequency of use of the patch.

11. The neural network of claim 1, wherein the patch element is generated or modified by the first and second inputs, are storage areas in a physical apparatus, and is a site of local learning in the immediate vicinity of paired conditioned and unconditioned stimuli.

12. The neural network of claim 11, wherein the physical apparatus is a VSLI chip.

13. The neural network of claim 1, wherein the patch element responds to conditioned and unconditioned stimuli in accordance with rules and methods to process the signals by organizing the signals into classes or features to condense or modify information to achieve the goals of an application of the network.

14. A neural network comprising a plurality of the neural network architectural units of claim 1.

15. A method for deciding whether to create a new patch in a neural network, said method comprising:
    (a) presenting as input to the neural network a conditioned stimulus and an unconditioned stimulus with which the conditioned stimulus is to be associated;
    (b) for each output neuron of the neural network, comparing values of the presented conditioned stimulus within the receptive field of the output neuron, with values of conditioned stimuli stored in all preexisting patches of the output neuron;
    (c) selecting the preexisting patch with the stored value most similar to the value of the presented conditioned stimulus; and
    (d) determining whether the similarity between the stored value of the selected preexisting patch and the value of the presented conditioned stimulus requires formation of a new patch.

16. The method of claim 15, wherein the similarity is determined as a correlation coefficient computed between the conditioned stimulus within the receptive field of the output neuron and the stored values in the preexisting patches.

17. The method of claim 16, further comprising determining the set of preexisting patches with expected values of unconditioned stimuli which match the value of the presented unconditioned stimulus.

18. The method of claim 15, wherein the selected preexisting patch is updated if the similarity between the presented conditioned stimulus and the selected preexisting patch is greater than a predefined threshold and if the value of the presented unconditioned stimulus matches the unconditioned stimulus value of the selected preexisting patch.

19. The method of claim 15, wherein the step of selecting comprises comparing only the active area of each patch with the value of the presented conditioned stimulus.

20. A neural network apparatus comprising;
    input terminals for receiving signals;
    signal processing means configured in a plurality of layers including;
    (i) a first layer of neuron circuits configured to isolate features from the signals received at the input terminals, the first layer being both an input layer and a non-output layer;

(ii) a second layer of neuron circuits connected to communicate with the first layer of neuron circuits to receive feature information carrying signals from the first layer, the second layer being both a non-input layer and an output layer and being operative to establish classifications of the features in the absence of a priori knowledge of the features;

(iii) output terminals receiving classification carrying signals from the second layer;

wherein at least one intermediate layer of neuron circuits connected successively between said first and second layers of neuron circuits, each said intermediate layer being both a non-input and a non-output layer and having at least one neuron circuit connected to receive outputs of neuron circuits from a preceding layer and to provide inputs to neuron circuits of a subsequent layer;

wherein the neuron circuits of the input layer include means for storing in a memory associations between an input pattern received by the neuron circuits and an input unconditioned stimulus value, thereby generating patches; and wherein the non-input layers include means for storing arbitrary labels of patches of neuron circuits from a preceding layer, thereby generating patches designated as meta-patches.

21. The apparatus recited in claim 20, wherein in each layer is stored a measure of similarity between each of its patches and an input pattern of the layer.

22. The apparatus recited in claim 21, further comprising means for storing a measure of similarity between patches of the input layer and a conditioned stimulus pattern, the conditioned stimulus pattern being the input pattern of the input layer.

23. The apparatus recited in claim 21, further comprising means for storing measures of similarity between patches of a non-input layer and arbitrary labels of patches from the neuron circuits of the preceding layer, the arbitrary labels identifying the input pattern of the non-input layer.

24. The apparatus recited in claim 21, wherein a neuron circuit in a non-output layer propagates to a subsequent layer the label of a patch having the greatest similarity to the input pattern of the neuron circuit.

25. The apparatus recited in claim 24, wherein the non-output layer is an intermediate layer and the similarity between the patch and the input pattern of the neuron circuit is determined by a means for comparing patch labels being propagated to the neuron circuit with patch labels stored in the meta-patch.

26. The apparatus recited in claim 25, wherein the comparing means comprises a counter counting at least one of matching and mismatching patch labels of the patch labels being propagated to the neuron circuit and the patch labels stored in the meta-patch.

27. The apparatus recited in claim 24, wherein the neuron circuit in the non-output layer further propagates an ordinal measure of similarity of the patch having the greatest similarity to the input pattern.

28. The apparatus recited in claim 27, further comprising circuitry for determining a weighted average of matching, wherein matches are assigned a value of +1 times the ordinal measure of similarity and mismatches are assigned a value of −1 times the ordinal measure of similarity, the weighted value of matching providing a measure of confidence for each match.

29. The apparatus recited in claim 21, wherein a neuron circuit in a non-output layer propagates to a subsequent layer the labels and similarity measures of all patches of the neuron circuit.

30. The apparatus recited in claim 29, wherein meta-patches of the neuron circuit in the subsequent layer compute a similarity value from patch labels previously stored in a patch vector of the meta-patch.

31. The apparatus recited in claim 21, further comprising means for storing a patch vector having similarity values and patch labels for a subset of all patches of a neuron circuit, the patch labels of the subset being one of either the top n patches or all patches exceeding a predetermined threshold.

32. The apparatus recited in claim 31, further comprising means for determining a similarity between a meta-patch of a neuron circuit of a non-input layer and the input pattern of the non-input neuron circuit as an average of similarity values paired with the patch labels stored in the patch vector of the meta-patch.

33. The apparatus recited in claim 32, further comprising means for identifying input similarity values of the meta-patch below a second predetermined threshold and ignoring the identified input similarities in classifying the input pattern of the neuron circuit.

34. The apparatus recited in claim 31, wherein meta patches having a similarity closest to a stored similarity value are propagated.

35. The apparatus recited in claim 20, wherein each neuron circuit has its own set of patches.

36. The apparatus recited in claim 20, further comprising means for storing a list of patches accessible to all neuron circuits of each layer and wherein the neuron circuit of each layer compares the input pattern of the neuron circuit with patterns in the patches in the list and generates a new patch only if no patch in the list is similar to the input pattern of the neuron circuit.

37. The apparatus recited in claim 36, further comprising means for partitioning the input pattern of a neuron into data vectors and comparing the data vectors to predetermined codes to identify matches.

38. A neural network comprising:

a plurality of sequential subnetworks having at least a first subnetwork and a final subnetwork, each subnetwork having input neurons, a plurality of patches, and output neurons;

wherein output signals are generated at the output neurons of each subnetwork by transmitting input signals received at the input neurons of the subnetwork through the plurality of patches of the subnetwork;

wherein the input neurons of the first subnetwork receive input signals from sources external to the neural network;

wherein each patch of the plurality of patches of the first subnetwork is generated in response to the input signals received by the input neurons of the first subnetwork;

wherein the input neurons of each subnetwork, except for the first subnetwork, are coupled to the output neurons of the previous subnetwork and receive as input signals the output signals generated at the output neurons of the previous subnetwork;

wherein the input neurons of the final subnetwork further receive unconditioned stimuli; and wherein one of the subnetworks, except the first subnetwork, receives identifying values from only a subset of the plurality of patches of the first subnetwork.

39. The neural network of claim 38, wherein the patches of the first subnetwork respond to features of the received input signals.

40. The neural network of claim 38, wherein the subset of patches of the first subnetwork are those having the highest similarity measures across a training set of signals presented to the first subnetwork.

41. The neural network of claim 38, wherein the subset of patches of the first subnetwork are those within a predefined range of variance with an unconditioned stimuli-specific signal.

42. The neural network of claim 38, wherein the subset of patches of the first subnetwork are those having the least variance with an unconditioned stimuli-specific signal, wherein patches having a variance greater than said least variance are added to the subset of patches to improve network performance.

43. The neural network of claim 38, wherein the neural network is used for classifying a pattern, wherein:
 (a) the subnetworks are connected in series by signal communication paths;
 (b) each subnetwork comprises a plurality of sequential layers having at least a first layer comprising the input neurons of the subnetwork and a final layer comprising the output neurons of the subnetwork, wherein the first layer of each subnetwork, except for the first subnetwork, is coupled to the final layer of the previous subnetwork;
 (c) the patches in the first subnetwork define a first level of features;
 (d) each subnetwork subsequent to the first subnetwork is selected by the output signals of the first subnetwork; and
 (e) the plurality of patches of each subsequent subnetwork increasingly refine classification levels.

44. The neural network of claims 43, wherein the plurality of subnetworks further comprises a plurality of second subnetworks coupled to the first subnetwork, wherein the input neurons of each second subnetwork receives a single patch group identification output from the first subnetwork.

45. The neural network of claim 44, wherein a group of patches is designated as a meta-patch.

46. The neural network of claim 43, wherein the plurality of subnetworks further comprises a second subnetwork having a first layer and two second layers, each second layer connected to the first layer of the second subnetwork, and wherein the first of the two second layers contains patches coupled to the final layer of the first subnetwork, and directs an input signal to be classified to a patch group, and wherein the second of the two second layers contains patches distinguishing individual patterns.

47. A method for classifying a pattern using the neural network of claim 43, the method comprising:
 (a) recognizing a set of features of the pattern to be classified by creating patches relating to the features in a first layer of the first subnetwork;
 (b) combining patch identification labels into a group using a second layer of the first subnetwork;
 (c) transferring the patch identification labels from the first subnetwork to a first layer of a second subnetwork, wherein patches based on the transferred patch identification labels are prevented from forming in the second subnetwork, and wherein new patches formed in the second subnetwork reflect the difference between a pattern generated by the first subnetwork patches and the pattern to be classified; and
 (d) grouping the new patches using a second layer of the second subnetwork, the second layer associated with unconditioned stimuli specific for the pattern to be classified.

48. The method of claim 47, wherein the pattern to be classified is a human face.

49. The method of claim 48, wherein the human face is presented to the neural network system using a digitized photograph of the face.

50. The method of claim 48, wherein the human face is presented to the neural network system using a frame obtained from a video camera output.

51. The method of claim 47, wherein the pattern to be classified is a Japanese Kanji character, and wherein the first layer of the first subnetwork recognizes a combination of strokes which is a component of the pattern to be classified, and wherein groupings by the second layer of the first subnetwork are a function of the size of the receptive field of the first subnetwork.

* * * * *